United States Patent [19]

Barlow et al.

[11] 4,382,215
[45] May 3, 1983

[54] SYSTEM AND METHOD OF PRECISION MACHINING

[75] Inventors: Allan R. Barlow, Georgetown; William A. Hunter, Danvers, both of Mass.

[73] Assignee: General Electric Company, Salem, Va.

[21] Appl. No.: 283,850

[22] Filed: Jul. 16, 1981

[51] Int. Cl.³ ............................................. G05B 19/42
[52] U.S. Cl. .................................. 318/568; 318/572; 318/632; 364/474
[58] Field of Search ............... 318/568, 572, 632, 569; 364/474

[56] References Cited

U.S. PATENT DOCUMENTS

| | | | |
|---|---|---|---|
| 3,605,531 | 9/1971 | Izumi et al. | 318/632 X |
| 3,605,531 | 9/1971 | Izumi et al. | |
| 3,727,119 | 4/1973 | Stanley et al. | 318/568 |
| 3,840,994 | 10/1974 | Izumi et al. | |
| 4,068,154 | 1/1978 | Cecil et al. | 318/568 |
| 4,118,871 | 10/1978 | Kirkham | |
| 4,195,250 | 3/1980 | Yamamoto | |

OTHER PUBLICATIONS

"Cejmatic Measuring Control for NC/CNC," 8/78, Published by C. E. Johansson, Box 365, S-631 05 Eskilstuna, Sweden.
*Modern Machine Shop*, Nov. 1980, Article entitled, "CAM Streamlines a Jet Engine 'Job Shop'".
"3 Dimensional Touch Trigger Probes for Machining Centers and Lathes"-80, Published by Renishaw Electrical Ltd., Gloucester Street, Wotton-under-Edge, Gloucestershire GL 127DN, England.
"3 Dimensional Touch Trigger Probes for Measuring Machines," Published by Renishaw Electrical Ltd., Gloucester Street, Wotton-under-Edge, Gloucestershire GL 127DN, England.
Reprint from "Machinery," May 24, 1978, Article Entitled, "Swedes Shows the Way with Unmanned Line".
"Renishaw 3 Dimensional Touch Trigger Probes," Published by Renishaw Electrical Ltd., Gloucester Street, Wotton-under-Edge, Gloucestershire GL 127DN, England.
Publication GEK-15239A, Published by General Electric Co., Numerical Equipment Control Department, Waynesboro, VA.
"Engineering Information," May, 1978, Published by C. E. Johansson, Box 365, S-631 05 Eskilstuna, Sweden.

*Primary Examiner*—B. Dobeck
*Attorney, Agent, or Firm*—James H. Beusse; Ormand R. Austin; Arnold E. Renner

[57] ABSTRACT

A system and method are disclosed for automatically machining a work piece to precise selectively determined dimensions under computer numerical control. A movable probe is calibrated against position reference surfaces and is then used to calibrate the position of a fixed probe. The latter serves as a position reference for calibrating the cutting edge of one or more cutting tools. All calibrations are performed under closed loop control. Appropriate tool position offsets are automatically determined from deviations between the programmed and the actual probe and tool positions and are entered into numerical control means to modify the programmed machining operation. After machining has been initiated, probing of the work piece occurs at least once before the final cut is taken and the appropriate tool position offsets are determined and entered to assure that the dimensions of the finished surface will conform to the desired selectively determined dimensions. Any dimensional deviations which are shown to exist upon probing of the finished surface, are indicated together with the allowable machining tolerances for each dimension.

12 Claims, 15 Drawing Figures

Microfiche Appendix Included
(2 Microfiche, 87 Pages)

SYSTEM AND METHOD OF PRECISION MACHINING

The present invention relates in general to closed loop numerically controlled machining systems and in particular to a system and method for machining a work piece to precise, selectively determined dimensions wherein machining, associated calibration and the implementation of the resultant tool position offsets are fully automated.

Appendix A

The Appendix A contains two sheets of microfiche. These sheets contain 87 frames of the computer program.

BACKGROUND OF THE INVENTION

At its present stage of development, the precision machining field is in a state of flux. Systems that are totally dependent on manual operations have largely given way to techniques whereby manufactured parts are made with general purpose, numerically controlled machining systems. Although cutting or other removal of material occurs automatically in such systems, numerous manual operations are still required, primarily for measuring the machined dimensions, and for making cutter adjustments using an ordinary numerical control cutter offset. These manual measurements and adjustments of the cutting tool are necessary to take into account a large number of variables, such as wear of the cutting tool, repositioning and/or replacement of the cutting tool, as well as dimensional changes of the cutting tool, the work piece and the machining apparatus itself due to such factors as heating, deflection under load and the like.

By way of example, in a typical operation carried out with a numerically controlled machine tool such as a lathe, certain adjustments, i.e., tool offsets, must be manually implemented by the operator after the machine is set up for the manufacture of a particular work piece or part. Prior to the start of machining the operator must advance the cutting tool to a tool setting surface and determine the tool position by manually measuring the space between the tool and the reference surface. This is normally done with a piece of shim material, or the like and such measurements then form the basis for manually making tool offsets. Where the lathe includes tool holding means such as a multiple tool turret, this operation must be carried out separately for each tool, as well as for each of the axes (of motion) of the machine. Prior to making the final or finishing cut for a particular work piece surface, the various dimensions of the semi-finished work piece surface are measured by using a hand-held gauge. This enables the operator to determine the required offset of the cutting tool which is used for the finishing cut. After the finishing cut is made, the work piece is again checked with the hand-held gauge in order to measure the conformance of the actual dimensions of the finished surface to the desired dimensions.

The manual operations described above are individually time-consuming and take up a significant amount of the total time required to machine a particular work piece to the desired dimensions. This serves to limit the manufacturing capacity of the machine tool. Considering present day costs of a lathe or a milling machine (machining center), any reduction of the capacity of the machine tool becomes a matter of economic significance. Further, all such manual operations are prone to introduce errors into the manufacturing process.

As is generally recognized, the solution to the foregoing problems is to automate manual measurements and the manual adjustments of the cutting tool, e.g., by the use of a computer-operated numerical control system. In such a system the computer may either be positioned remote from the numerical control unit, or it may be incorporated in the latter, e.g., in the form of a microcomputer. Alternatively, a computing capability may be provided remote from the numerical control unit as well as being incorporated into the latter. Instead of down-loading successive blocks of data stored on tape or the like as is the case in an ordinary NC system, a computer numerical control (CNC) system is capable of storing entire programs and calling them up in a desired sequence, editing the programs, e.g., by addition or deletion of blocks, and carrying out the computations of offsets and the like.

Although fully automatic systems have not been widely adopted at this stage of development of the precision machining field, a considerable amount of development work has been done to date, much of it limited to special purpose situations wherein a single machining operation is repetitively carried out. It is also known to mount a contact probe or tool sensor on the bed of the machining apparatus, or on a pivotal arm that can be swung out of the way when desired. The position of the cutting tool can be calibrated against such a probe by noting the tool position when contact with the probe occurs. From the observed deviations between the programmed and the actual positions, a compensating offset may be determined and stored in the memory associated with the computer numerical control means. The offset compensates for the difference between the programmed contact position and the actual contact position. Further, it is known to mount a contact probe or part sensor in the tool holding means; to calibrate such a probe against a reference surface on the machine; to probe the machined surface of the work piece and to derive from such probing the information for determining the final offset required for the finishing cut; and to probe the finished surface for conformance with the desired dimensions.

Although some of the foregoing operations have been automated in the past by means of closed loop numerically controlled machining systems, many of these systems fail to provide the necessary accuracy for high-precision machining operations, for example, for machining high-precision parts for aircraft engines or the like. Such improvements as have been implemented to date to enhance the precision of closed loop numerically controlled machining systems often require special purpose equipment which may materially increase the total cost of the system. To the extent that the complexity of the overall system is increased by the use of such equipment, system reliability may be diminished with attendant adverse effects.

An example of a system in which complex special purpose equipment is used in order to enhance the obtainable precision of the machining operation is given by U.S. Pat. No. 4,195,250. The patent discloses an arrangement which uses two probes or styluses operating under numerical control. These styluses are alternately brought into contact with a pair of points selected to lie opposite each other, e.g., diametrically opposite each other on the work piece which is to be measured. The deviation of the desired value from the actual value is determined and is used as tool position compensating data. As stated in the patent, such a measurement can be achieved independently of such factors as main spindle displacement caused by the thermal displacement of the machine tool, or by the non-coincidence of the machine coordinates with the program coordinates. Clearly, the techniques described in the patent requires apparatus whose complexity tends to raise the cost of the overall system. Due in part to the complexity of the equipment and technique employed, errors may occur as explained in the patent. For example, the heat generated by the motors which move the cross slide is likely to affect the positioning accuracy.

Another arrangement disclosed in the same patent shows a single stylus which moves under numerical control and which is alternately brought into contact with the aforesaid opposite points on the work piece. The amount of movement of the stylus head between the two points is measured for the period of time required and this measurement is added to those already in the numerical control means to determine the actual dimension between the points, as well as the required compensation of the tool position. Here again, special purpose equipment is required with the attendant disadvantages discussed above.

OBJECTS OF THE INVENTION

It is a primary object of the present invention to provide a new and improved system and method for automatically machining a work piece to precise, selectively determined dimensions under computer numerical control, in which the disadvantages of prior art systems and techniques are minimized.

It is another object of the present invention to provide a new and improved system and method for automatically precision machining a work piece wherein manual operations are substantially eliminated and the opportunity for operator error is reduced.

It is a further object of the present invention to provide a new and improved system for automatically precision machining a work piece, which uses apparatus that is relatively simple and economical in construction.

It is still another object of the present invention to provide a new and improved, generally applicable system and method for automatically precision machining a work piece, which are not limited to a particular type of machining apparatus and wherein the method has applicability beyond repetitive machining operations on a specified work piece.

It is still a further object of the present invention to provide a new and improved system and method for automatically precision machining a work piece which is independent of the geometry and design of the machining apparatus employed.

SUMMARY OF THE INVENTION

In accordance with the present invention, a system and method are disclosed for machining a work piece to precise, selectively determined dimensions. The term "machining", as used herein, may apply both to the removal of material from a specimen or work piece and, in a broader sense, to the total manufacturing process required to produce a finished work piece surface having desired dimensions. Hence, in its broad context the term may embrace the calibration of the tool and of the different probes employed, the measurement of the work piece surface at various stages of the process and the entry of compensating offset adjustments where required. In the present invention all of these steps are automatically carried out as needed. The operation can be performed quickly for each surface to be cut, thereby increasing the potential manufacturing capacity of the machining apparatus used.

In accordance with the principles of the present invention a pair of probes is used, each being separately calibrated. One probe is used for probing the work piece and the second one for calibrating the cutting edge of the cutting tool. Initial tool offset adjustments are determined, based on the deviations between the programmed and actual positions (1) of the first probe and at least a pair of reference surfaces; (2) of the first and the second probes; and (3) of the tool cutting edge and the second probe. These offsets are entered into the numerical control means before any machining takes place. Subsequently, following a re-calibration of the first probe, probing of the machined surface occurs at least once before the finishing cut is taken and appropriate offsets are again determined from the observed deviations and entered into the numerical control means. These latter offsets modify the operation controlled by the stored machining program so as to provide a finished surface having the desired dimensions when the cutting process is complete. Further probing is carried out following the completion of the finishing cut in order to determine the actual dimensions of the finished surface and the extent to which deviations, if any, fall outside allowable tolerances.

The invention will become clear from the discussion below, when read together with the accompanying drawings in which applicable reference numerals have been carried forward.

DESCRIPTION OF THE INVENTION

Figure 1:
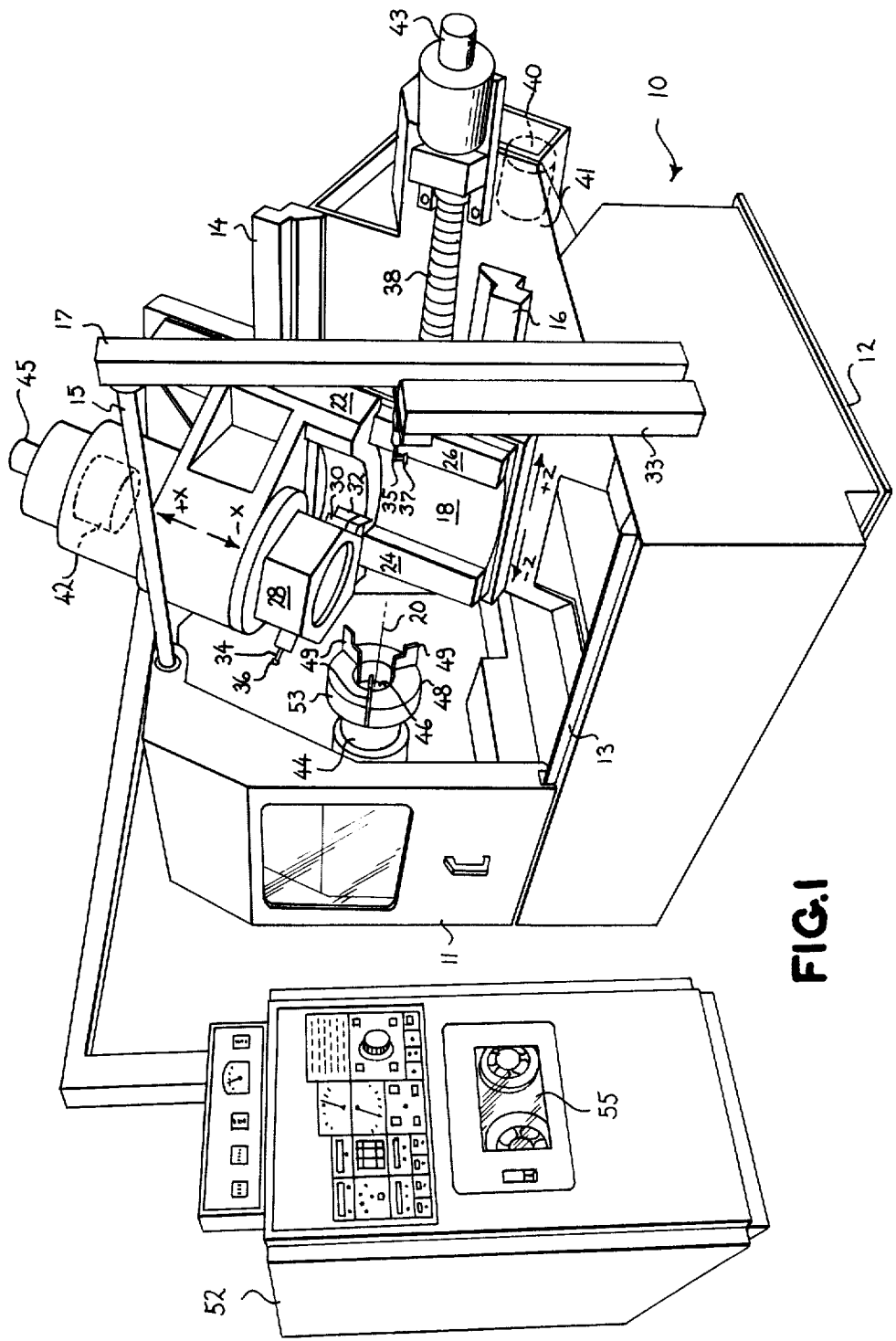
FIG. 1 is a perspective view of an exemplary chuck type lathe having a rotatable turret adapted to bring a plurality of cutting tools or probes into operating position.

With reference now to the drawings, FIGS. 1-5 illustrate machining apparatus in the form of a chuck lathe. FIG. 1 is a perspective view and FIGS. 2-5 provide simplified elevation views. Lathe frame 10 is supported on a set of legs 12 and carries a pair of mutually spaced ways 14 and 16. In the illustrated embodiment, way 14 is disposed at a greater height above frame 10 than way 16 and the lathe bed so defined slopes down toward the viewer at a 60° angle. However, it will be understood that the invention is not so limited and that the lathe bed may be horizontal, or it may be positioned at any desired angle with respect to the horizontal.

A door 11 is supported by a rail 13 and a rod 15, the latter being held at one end by a post 17. Door 11 is adapted to slide forward to close off the area where machining is in progress. A saddle 18 rests on ways 14 and 16, in sliding contact therewith. Saddle 18 is capable of travel in either direction along the Z axis of the machining apparatus. The Z axis is seen to be parallel to center line 20 of lathe spindle 44. Positioning of saddle 18 along the Z axis is carried out by means of a conventional lead screw arrangement, wherein the lead screw, (not visible in the drawing), is located inside an enclosure 38 and is driven by an electric motor 40 positioned behind a cover 41. The motor may be a DC drive motor capable of driving the lead screw in opposite directions.

Saddle 18 carries a pair of ways 24 and 26 on which a cross slide 22 is supported in sliding contact therewith. Cross slide 22 is capable of travel along the X axis of the machine apparatus, which is perpendicular to the Z axis in the illustrated embodiment. Positioning of cross slide 22 in the X axis is carried out by means of another conventional lead screw arrangement wherein the latter lead screw, (not visible in the drawing), is disposed parallel to the X axis. An electric motor 42 is capable of driving the latter lead screw in opposite directions.

A pair of resolvers 43 and 45, or similar position indicating means, is coupled or geared to the drive shafts of motors 40 and 42 respectively, or to the lead screws connected thereto. Each resolver is adapted to provide a feedback signal representative of the rotary position of the corresponding lead screw and thus representative of the linear position of saddle 18 or cross slide 22 on their respective ways. Alternatively, suitable electronic or opto-electronic encoding devices, such as a commercially available Inductosyn Scale, may be used to indicate the position of saddle 18 and cross slide 22 directly on their respective ways.

A turret 28 is carried by cross slide 22 and includes a plurality of tool holding means. In the illustrated embodiment of the invention the turret is capable of mounting twelve separate tools which, by appropriately indexing, i.e., rotating the turret around the X axis, may be individually brought into operating position. For the sake of simplicity, turret 28 is shown as carrying only a single cutting tool 30 and a contact probe (part sensor) 34. In a typical embodiment of the invention, the turret may carry a roughing tool as well as a finishing tool.

Probe 34 is mounted in a tool holding position of the turret and includes an elongated stylus which terminates in a spherical tip 36. The probe further includes means for generating an electrical signal when the probe is tripped by deflection upon contact with a surface.

It will be clear that the invention is not limited to the use of a turret and that other types of tool holding means may be employed. For example, a tool magazine may be used which is capable of holding a relatively large number of tools that may be individually selected and advanced into operating position.

An arm 33 is mounted to frame 10 and carries a contact probe (tool sensor) 35. The illustrated mounting of probe 35 on arm 33 is the equivalent of mounting this probe directly to the lathe bed. The latter arrangement, although simpler to implement, is more prone to interfere with machining operations and with setting-up operations on the lathe. In an alternative arrangement arm 33 is capable of swinging out of the way to make room for machining operations. In all of these arrangements however, the arm provides a fixed location of probe 35 relative to the lathe bed wherein the probe tip 37 is disposed above the lathe bed. Hence the expression "bed-mounted", as used herein, is intended to cover each of these embodiments. Probe 35 includes an elongated stylus which terminates in tip 37 which lies in the plane defined by the X and Z axes above the lathe bed. In a preferred embodiment of the invention, probe tip 37 is substantially cube-shaped, whereby appropriate cube faces are substantially normal to the Z and X axes, respectively. Probe 35 further includes means for producing an electrical signal upon tripping of the probe by deflection when a surface is brought into contact therewith.

Rotatable spindle 44 includes a spindle nose or face 46 which abuts work piece holding means 48, i.e., a chuck which is adapted to rotate with the spindle. The intersection of the plane of surface 46 with center line 20, coincident with the spindle axis, defines the origin position "0" from which the manufacturer of the particular machine tool establishes machine element and cutting tool locating specifications to aid in programming the system. Thus, while all programmed positions are referenced to the origin, the measuring system of the machine tool itself always counts or measures relative to a "home" position. The latter is normally located as far away from the spindle nose and center line as saddle 18 and cross slide 22 are able to move. For example, if the home position is +26.0000 inches on the Z axis and +17.0000 inches on the X axis from the origin, a programmed move from home to the origin will be Z-26.0000 and X-17.0000, ignoring any allowance for the thickness of the chuck, tool length or distance from the center line of turret 28 to the tool locating face. A digital position readout display on the machine will count from 0 to −26.0000 on Z and from 0 to −17.0000 on X. However, the programmed, i.e., commanded, position will be counting in the opposite direction from +26.0000 to 0 on Z and from +17.0000 to 0 on X.

Thus, the origin 0, i.e., the intersection of the spindle nose and the center line, provides a uniform point with respect to which the machine tools of various manufacturers may be programmed. However, the home location of these different machine tools relative to origin 0 will vary depending on the size, type of the machine tool and its particular manufacturer.

Chuck 48 carries a set of chuck jaws 49 which are adapted to hold a work piece. The chuck includes a pair of position reference surfaces 53 and 54 which are normal to the X and Z axes, respectively and which are positioned at a known, calibrated distance from the position origin. Specifically, datum surface 53 constitutes the cylindrical external chuck surface and the chuck face provides datum surface 54.

Unit 52, which is referred to as numerical control means herein, is seen to include a tape transport 55 in the illustrated embodiment of the invention. The tape stores the numerical control program for machining the work piece in the form of code words representative of different kinds of instructions, e.g., to index turret 28; to turn on the coolant required for machining; to rotate the spindle in a selected direction and at a selected speed; to move the probe or the tool in a particular sequence of steps for calibration, measuring or cutting purposes by positioning saddle 18 and cross slide 22; etc. The tape may also store various data, such as the desired dimensions of a particular surface which is to be machined, the allowable machining tolerance for each dimension and certain parameters that must be taken into consideration depending on the part which is to be machined, the particular tool or tools to be used, etc.

In a preferred embodiment of the invention, numerical control means 52 may incorporate a computer, e.g., a microcomputer, which responds to the stored code words on tape. The microcomputer than causes the appropriate control signals to be issued, e.g., to motors 40 and 42, which will give effect to the tape commands. The microcomputer is also responsible for processing the data acquired through various probing operations and for computing offsets which may produce changes in the cutting operations carried out by the machining program by modifying the aforesaid control signals. All of these functions may also be carried out in a remotely positioned computer, e.g., in the central computer of a distributed numerical control system, so that the processed data is fed to unit 52 which then generates the appropriate control signals. In such an arrangement, some computing capability may also be retained in numerical control means 52.

Unit 52 is electrically coupled to, among other devices, motors 40 and 42, resolvers 43 and 45 and probes 34 and 35. The data received from the probing operations, feedback data from the resolvers and data loaded in through the program itself, is processed by the microcomputer to compute the aforesaid tool offsets. If motor control signals are derived from the processed data, they are compared against the position feedback data received from the respective motor resolvers or from other position feedback means. A closed loop system is thus established in which the differential determined upon comparison of the two signals is used to control the position of the cutting edge of the cutting tool, or the position of the measuring probe.

In a preferred embodiment of the invention, unit 52 is implemented in the form of apparatus which is commercially available from General Electric Company under the designation Mark Century ®, Model 1050 Microprocess Numerical Control. In addition to the above-described functions, this unit may also be used to compute, display and print the physical dimensions of the work piece, as well as deviations from the programmed values and allowable machining tolerances.

Each of probes 34 and 35 may be a switch contact probe of the type that is commercially available from Renishaw Electrical, Ltd. of England. Each probe provides a signal when the probe stylus is deflected and tripped upon contact with a surface. The probes are preferably omni-directional, which allows readings to be taken in any of five or six directions. Stylus overtravel upon contact with a surface prevents damage to both the surfaces, the machining apparatus and the probe. The internal mechanism of the probe assures that the stylus returns to its equilibrium position when contact is broken. For the bed-mounted probe 35, a directly wired signal connection is provided in the preferred embodiment of the invention. Turret-mounted probe 34, on the other hand, may transmit its signals through slip rings and brushes. Alternatively, an inductive signal transmission system may be employed which does not depend on a direct wired connection or on slip rings.

To provide a better understanding of the present invention, the method of operation will be first explained in general terms and the individual operations and specific steps thereof will be subsequently discussed in greater detail.

Figure 2:
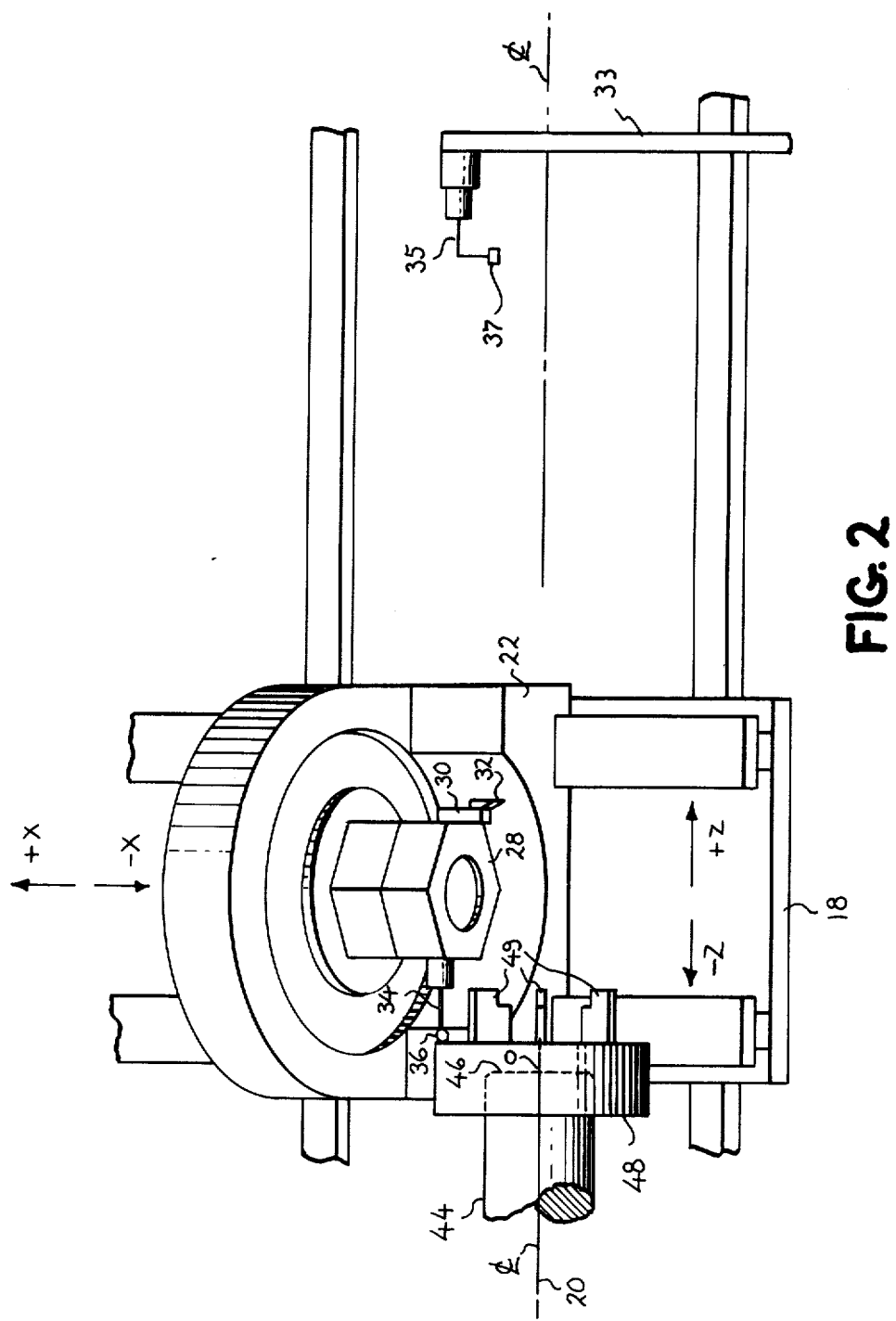
FIG. 2 is a simplified elevation view of the apparatus of FIG. 1 in position for calibration of the turret-mounted probe.

Various types of calibration/measuring operations are performed in conjunction with the cutting operation when a single surface of a work piece is machined. Among these are the calibration of probe tip 36 of turret-mounted probe 34, which is preferably carried out immediately preceding each use of this probe. This calibration is performed with the turret indexed, i.e., rotated, around its own axis to the position shown in FIG. 2. This places probe 34 in a first one of its two operating positions, for probing position reference surfaces 53 and 54 in two separate operations. In order to probe surface 54, it is necessary to position turret 28 appropriately relative to chuck 48. Accordingly, motor 42 is energized under the control of numerical control unit 52 and causes cross slide 22 to move in the X axis to a location opposite surface 54. Likewise, motor 40 is energized under the control of numerical control unit 52 to cause saddle 18 to move in the Z axis as shown. The action of motors 40 and 42 causes turret 28, and hence probe tip 36, to be positioned in the Z and X axes respectively. Positioning in the Z axis continues until probe tip 36 establishes contact with position reference surface 54. This last condition is illustrated in FIG. 2, which shows turret-mounted probe 34 in position for calibration.

As contact occurs between probe tip 36 and reference surface 54, probe 34 is tripped and the contact condition is indicated to numerical control means 52 by the signal generated by the trip action. Feedback data is provided separately for each axis by resolvers 43 and 45, which are associated with motors 40 and 42 respectively. Alternatively, such feedback data may be generated for each axis by an Inductosyn or other suitable measuring scale associated with the mechanism for moving saddle 18 and cross slide 22, respectively.

The probe-generated signal causes the feedback data to be compared in unit 52 with the corresponding programmed data for each axis. In this connection it should be noted that the position information which is fed back to the numerical control means must be corrected by an amount equal to the radius of probe tip 36 before the comparison is made, since the programmed data is directed to the position of the probe tip center. Information concerning the probe tip radius is normally present in the program stored in numerical control means 52. Thus, the compared Z axis quantities are the programmed contact position of the center of probe tip 36 relative to the origin and the actual contact position of the probe tip center relative to the origin. The deviation between the compared quantities is computed and stored in the microprocessor which may be incorporated in numerical control means 52, as stated above. The stored deviation is subsequently used in the computation of a compensating tool offset in the Z axis.

The operation described above is repeated for the X axis. Specifically, by energizing motors 40 and 42 under numerical control, turret 28, and hence probe tip 36, is positioned in the X axis until the probe tip makes contact with reference surface 53. The signal which is generated when contact occurs again provides an indication to numerical control means 52 to perform a comparison between the position feedback data of resolver 45 and the corresponding programmed information. The computed deviation, if any, is again stored for subsequent use in computing a compensating tool offset in the X axis.

Newly calibrated turret-mounted probe 34 is now ready to calibrate bed-mounted probe 35. The relative triggering pressures of the two probes must be set such that probe 35 is triggered without triggering probe 34 when contact is established between probe tips 36 and 37. The operation is initiated by indexing turret 28 so that probe 34 is moved to its second operating position, which is conveniently located at a 180° displacement from the first operating position in the illustrated embodiment of the invention. The turret indexing step is determined by the location of the bed-mounted probe on the opposite side of turret 28 from chuck 48. Thus, if probe 35 were positioned at some position other than the 180° displacement point, the turret would be indexed through the appropriate angle. It is also possible to place probe 35 to the left of turret 28, as viewed in FIG. 1, provided all interference with the setting-up and cutting operations is minimized. With such an arrangement no indexing of the turret is required.

Figure 3:
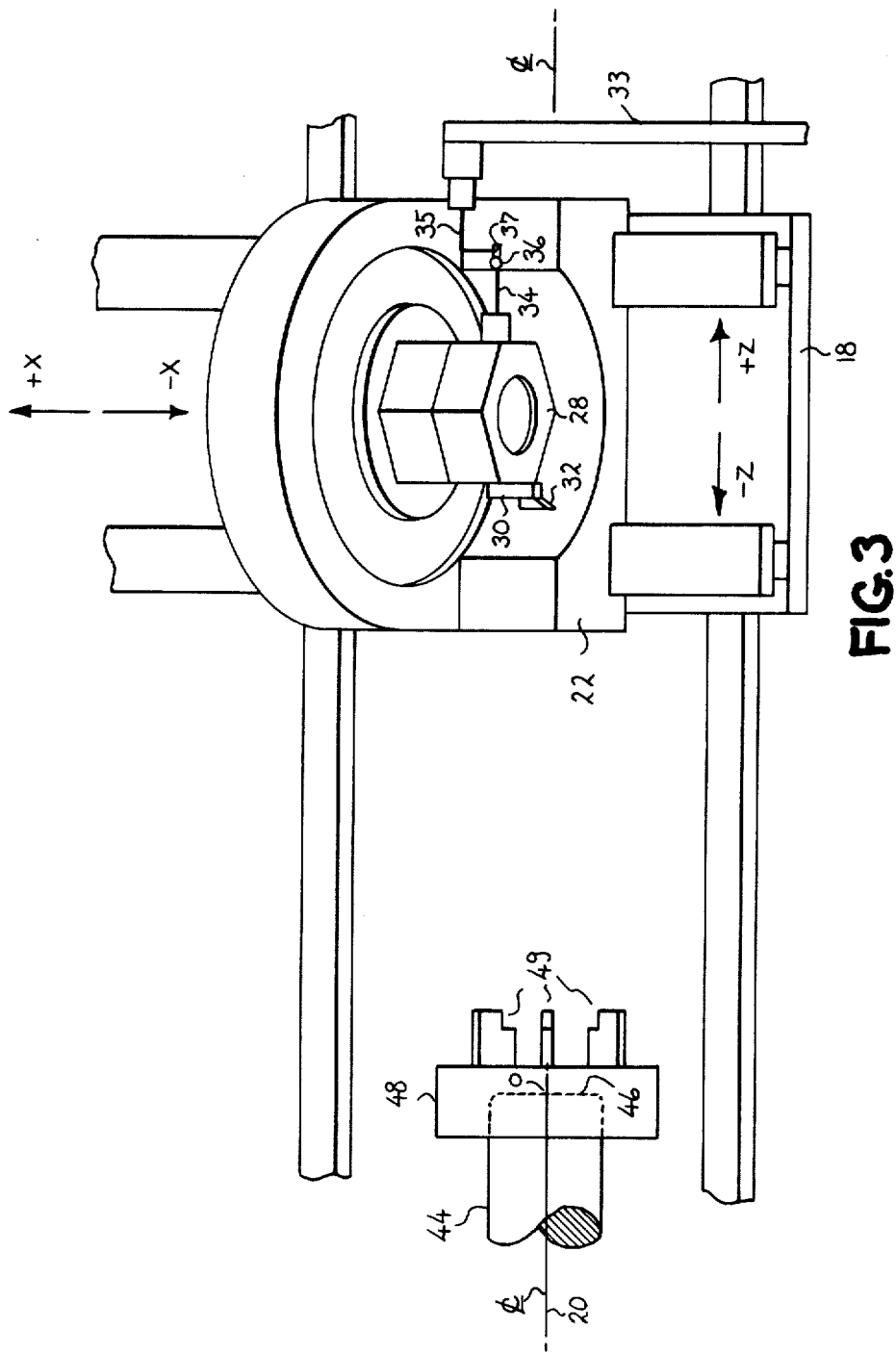
FIG. 3 illustrates the apparatus of FIG. 1 in position for calibration of the bed-mounted probe.

The calibration of cube-shaped probe tip 37 minimally requires two measurements, i.e., in the Z axis and in the X axis, in order that probe tip surfaces normal to each axis may be calibrated. Motors 40 and 42 are appropriately energized through numerical control means 52, such that probe tip 36 is positioned in the X axis to a location opposite probe tip 37, and in the Z axis until it makes contact with a surface of probe tip 37 normal to that axis. The contact position is illustrated in FIG. 3, which shows the apparatus in position for calibration of the bed-mounted probe.

Upon contact between probe tips 36 and 37 in a manner whereby probe 35 is tripped without tripping probe 34, the signal generated by probe 35 notifies numerical control means 52 to compare the programmed Z axis position of the center of probe tip 36 with its actual position. The deviation between the actual and programmed positions is computed for the radius of probe tip 36, as well as for the distance from the contacted surface of probe tip 37 to the center of the latter probe tip. As before, the deviation is stored in numerical control unit 52 for later use in computing the tool offset in the Z axis. The operation serves to calibrate the contacted surface of probe tip 37, i.e., the surface normal to the Z axis. A similar operation is performed in the X axis to calibrate the contacted surface of probe tip 37 and to store a deviation for the subsequent computation of the tool offset in the X axis.

Figure 4:
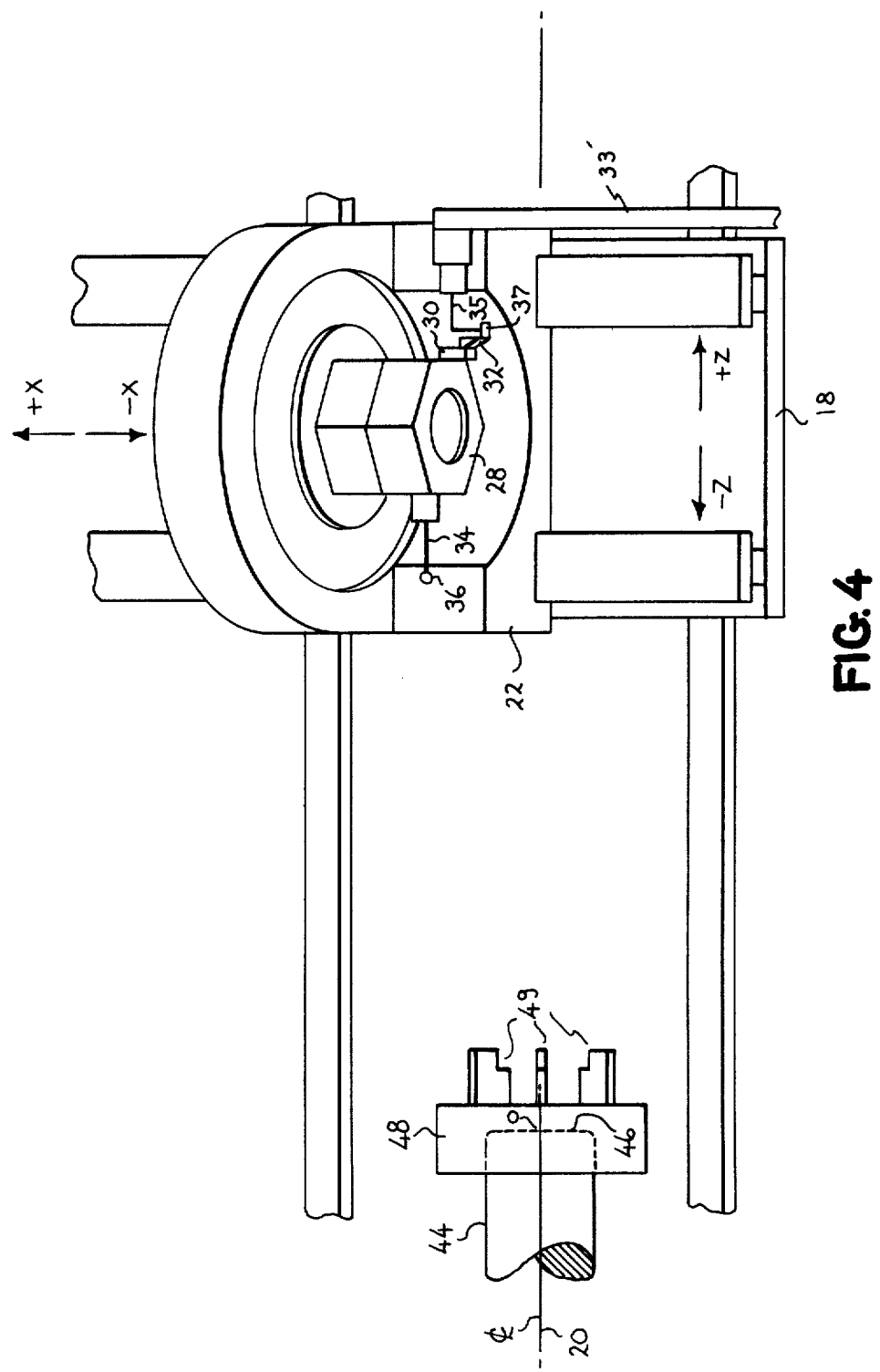
FIG. 4 illustrates the apparatus of FIG. 1 in position for calibration of the cutting tool.

Newly calibrated probe tip 37 next serves as a position reference for calibrating the position of cutting edge 32 of tool 30, as illustrated in FIG. 4. A calibration of the cutting edge is performed in a preferred embodiment of the invention whenever a new cutting tool is installed to replace the existing one in the same tool holding location; when a different tool mounted on the same turret is used; when the cutting tool is set up for a different work piece or for a different machining operation on the same work piece; and following a machining operation which is likely to produce wear of the tool cutting edge. In each such instance, the measurement is made with reference to the calibrated probe tip 37 of bed-mounted probe 35, with tool 30 placed in its second operating position.

In the embodiment illustrated in FIG. 4, turret 18 must be indexed 180° for this operation. Motors 40 and 42 are energized as determined by numerical control means 52 to position tool 30 in the Z and X axes. Positioning in the Z axis continues until cutting edge 32 makes contact with that surface of cubical probe tip 37 which is normal to the Z axis. When probe 35 is tripped, numerical control means 52 is notified by the trip signal to store the deviation between the programmed and the actual Z axis positions of cutting edge 32, the latter position being derived from the data fed back by resolver 43.

Thereafter, tool 30 is backed off from probe tip 37 and re-positioned through the appropriate energization of motors 40 and 42 until contact is made by cutting edge 32 with the surface of probe tip 37 which is normal to the X axis. When probe 35 is again tripped, the position feedback data provided to numerical control means 52 by resolver 45 indicates the actual X axis position of cutting edge 32 upon contact with the probe tip surface. As before, the computed deviation between the programmed and the actual X axis positions of the tool cutting edge is stored for subsequent computation of the X axis tool offset.

At this time, three deviations for each axis have been stored in the numerical control means, computed for the difference (if any) between the programmed and actual contact positions for the following contacts: (1) turret-mounted probe/position reference surface; (2) turret-mounted probe/bed-mounted probe; and (3) tool cutting edge/bed-mounted probe. The microcomputer now computes the applicable initial tool offset in each axis from these three deviations. It will be understood that the offset so computed for a particular axis may need to be further corrected for a variety of reasons. For example, if spindle face 46 is not in the expected location for some reason, or if the work piece held in the chuck jaws does not abut face 46, all Z axis measurements made on the work piece will be incorrect unless the previously computed offset is further corrected by the appropriate amount. The ultimately computed tool offset for each axis is then stored in unit 52.

The foregoing operation must be repeated for each cutting tool which is to be used for a cutting operation. In the illustrated embodiment, the tool is then indexed 180° from the position in which it was calibrated in order to return it to its first operating position, as shown in FIG. 3.

Figure 5:
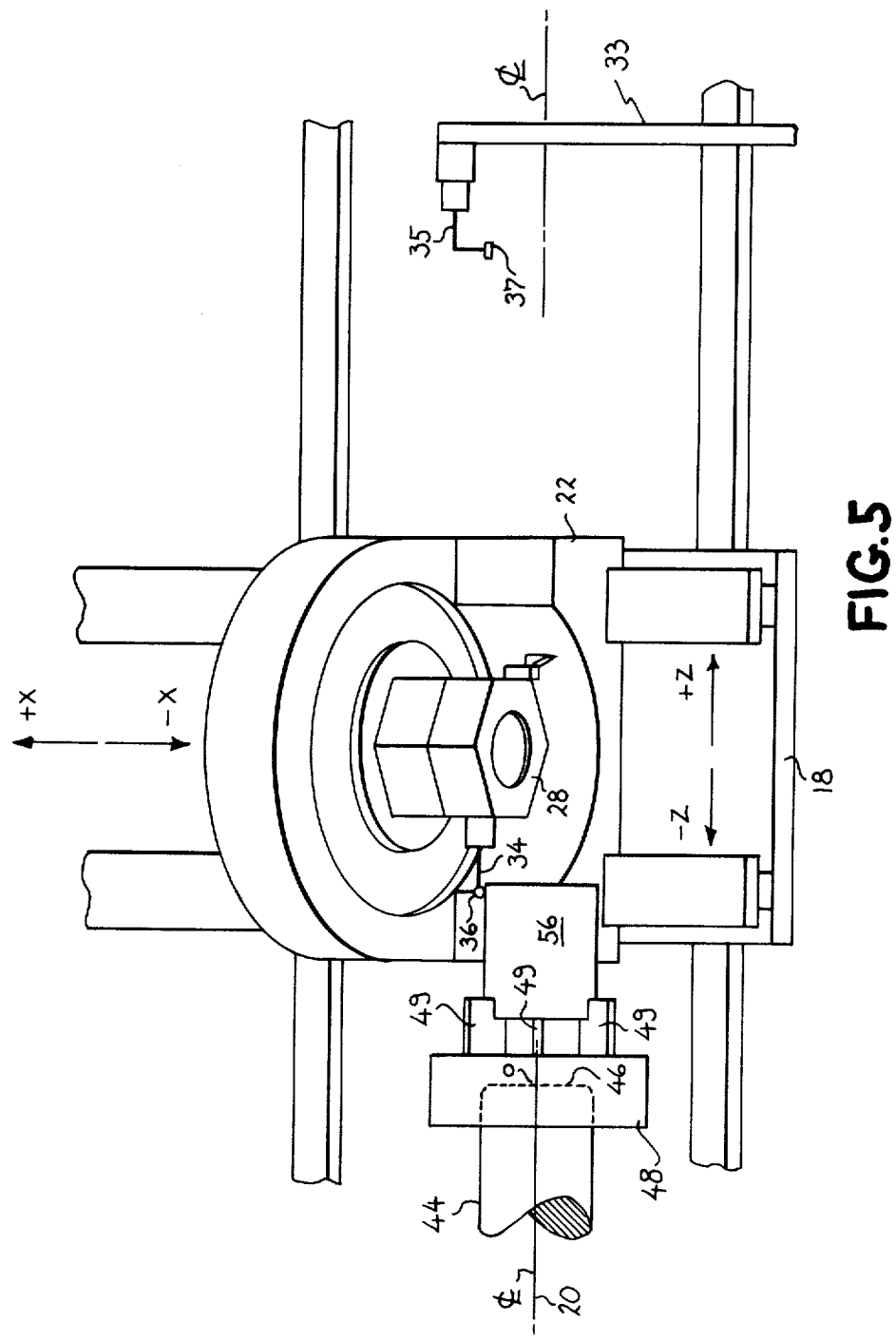
FIG. 5 illustrates the apparatus of FIG. 1 in position for probing a work piece surface.

The tool is now ready to begin cutting when brought into contact with the rotating work piece and fed against the latter. The work piece is held by the jaws of chuck 48, substantially as shown in FIG. 5. The cutting operation proceeds under the control of the tape-stored machining program, but it is further modified by the tool offsets stored in unit 52 for each axis. The machining program determines the action of motors 40 and 42 which, in turn, determine the position and feed rate of the cutting tool. Likewise, the relative motion between cutting edge 32 and work piece 56, which is produced by the rotation of the work piece, is controlled by the machining program and results in the removal of material from the work piece as the cutting tool is fed against it.

In accordance with the present invention, rough cutting of a given surface proceeds until a predetermined amount of material remains to be removed. The amount left is preferably chosen so that it can be cut, either with the same tool or with a separate finishing tool, with two relatively shallow cuts of substantially equal depth, e.g., 10 mils, taken at the same feed rate. If these cuts are identical, tool deflection due to strain and/or deflection of the tool holder and of other parts of the machine, should be substantially the same.

Where a separate finishing tool is used for the last two cuts or for the last cut alone, the cutting edge of the finishing tool must be calibrated in the manner explained above in connection with tool 30. Specifically, the finishing tool is moved to the second operating position, (shown in FIG. 4), by suitably indexing turret 28 and it is calibrated there. Thereafter, it is moved to the first operating position, (shown in FIG. 3), and is brought into contact with the rough-cut surface of the rotating work piece for the purpose of making a semi-finishing cut.

Following the semi-finishing cut turret 28 is again indexed, this time to bring the turret-mounted probe 34 into the first operating position, as shown in FIG. 5. For maximum machining accuracy, probe tip 36 is again calibrated in both axes. Assuming the outside diameter of the work piece is to be measured with the probe as illustrated in FIG. 5, probe tip 36 must first be re-calibrated in the X axis by contact with position reference surface 53, substantially as described above. The purpose of the calibration at this time is to compensate for any changes that may have occurred in the X axis since the last calibration, e.g., tool wear and dimensional variations due to heating of portions of the machine tool as a result of the cutting operation. Such changes may also affect Z axis dimensions and hence the probe is also re-calibrated in the Z axis. If changes are detected upon calibration, they are stored as deviations in the numerical control means, substantially as explained above.

Following this calibration step, motors 40 and 42 are appropriately energized and the turret is positioned until probe 34 is tripped by contact of tip 36 with the semi-finished work piece surface. The position of probe tip 36 in the X axis, as determined by resolver 45, is fed back to the numerical control means. Upon comparison with the corresponding stored programmed position of probe tip 36, a deviation, if any, is computed and stored. A tool offset correction can now be computed in each axis from the last two stored deviations, i.e., from the deviations determined upon re-calibration of the first probe and upon probing the semi-finished surface. These tool offset corrections are stored in numerical control means 52.

The final tool offsets are computed from the aforesaid offset corrections and from the initial tool offsets which were determined prior to the start of machining. The final tool offsets modify the final cutting operation controlled by the tape-stored program, so that the proper amount of material is removed from the semi-finished surface to obtain a finished surface having the desired dimensions.

In the example given above, the finished surface dimension applies to the outside diameter of a substantially cylindrical work piece surface and probing is normally carried out only at one point on the work piece. It will be clear that various points around the periphery of the semi-finished surface may be probed if greater precision is required, or if it is desired to measure the concentricity of the semi-finished surface. Similarly, X axis probing of a surface at several points along the Z axis will establish the degree of parallelism, or lack thereof, of the probed surface with respect to center line 20. Such X axis probing at multiple points along the Z axis is also, of course, required when the angle of a tapered surface is measured.

It should be noted that the measurement of the work piece surface in effect serves to re-calibrate the cutting edge of the tool. For example, let it be assumed that the machining operation had programmed the tool to take a 10 mil semi-finishing cut on an outside diameter surface. If the probe measurement of the semi-finished surface indicates that only 9 mils of metal was removed, a 1 mil offset is stored in the numerical control unit as an adjustment of the X axis position of the cutting edge.

After the semi-finished surface has been probed and the appropriate adjustments for the final offsets have been entered into numerical control means 52, turret 28 is indexed to bring the finishing tool into the first operating position preparatory to taking the finishing cut. As previously explained, in order to maintain tool deflection constant during the finishing and semi-finishing cuts, the depth of these two cuts are preferably selected to be substantially identical. However, the depth of the finishing cut may be modified by the amount of the final offset entered into the numerical control means following the probing of the semi-finished surface. In the example above, where both cuts are intended to be 10 mils deep but the semi-finishing cut has removed only 9 mils of metal, the finishing cut must remove the remaining 11 mils. Under normal conditions, the difference will be small so that there will be only a negligible change in the deflection of the tool produced when each cut is made.

As previously explained, the method disclosed herein is not limited to the use of two cutting tools. Situations may exist in which the same tool is used throughout and the above-discussed steps of calibrating the finishing tool separately from the roughing tool can be dispensed with. Conversely, where more than two tools are required for a particular machining operation, each tool used must be separately calibrated.

Upon completion of all cutting operations, turret 28 is once more indexed to the position shown in FIG. 5 in which probe 34 is in the first operating position. Probe tip 36 is now again calibrated in the manner described above. Subsequently, motors 40 and 42 are appropriately energized to bring probe tip 36 into the vicinity of the finished surface and then, by X axis positioning, into contact with it. The position feedback data provided by resolver 45 upon contact is compared to the programmed X axis position of probe tip 36 and a deviation is computed which is stored in the numerical control means. The actual final dimension, i.e., the actual outside diameter of the machined surface in the example under consideration, is computed from the last-stored X axis deviation and the deviation stored as a result of the most recent probe calibration.

The system under consideration preferably includes a display device and/or a printer, by means of which all final dimensions, as well as the allowable tolerance for each, may be indicated to the operator of the machine tool. The allowable tolerances must of course be previously stored in the program. From a comparison of the desired final dimensions (programmed dimensions) and the actual final dimensions, the amount by which the latter deviates from the desired final dimension may be computed and displayed together with the corresponding allowable tolerance. In the example under consideration, the deviation of the actual diameter of the final surface from the desired (programmed) final diameter dimension may be displayed by unit 52, together with the allowable outside diameter tolerance.

The foregoing discussion is intended to provide an overview of the present invention, which is directed to a system and method for machining a work piece surface to precise, selectively determined dimensions. Listed below are specific operations that may be carried out automatically with a closed loop CNC or DNC numerical control system in accordance with the present invention. Although the invention is not so limited, the process of machining the work piece is explained with reference to a lathe of the type shown in FIG. 1. The sequence of operations is as follows:

(1) Calibration of the turret-mounted probe.
(2) Calibration of the bed-mounted probe.
(3) Calibration of the cutting edge.
(4) Making initial tool offsets.
(5) Performing rough and semi-finish cutting of the work piece or other removal of material.
(6) Calibration of the turret-mounted probe.
(7) Probing the cut work piece surface with the turret-mounted probe.
(8) Making final tool offsets.
(9) Performing finish cutting of the work piece or other removal of material.
(10) Calibration of the turret-mounted probe.
(11) Probing the finished machined work piece surface with the turret-mounted probe.
(12) Displaying and/or printing of finished work piece sizes and their deviation.

It will be understood that those portions of steps (1)–(4), (6)–(8) and (10)–(12) above, which deal with the computation of deviations and of offset adjustments, are carried out in the microcomputer which is preferably incorporated into unit 52. Those portions of these same steps that deal with the positioning of the probe and tool, as well as steps (5) and (9), are carried out under the control of the tape-stored program. The operation is such that the deviation (if any) between the position at which a probe is programmed to trip and the actual tripping position is displayed by the display means incorporated into unit 52.

In the discussion below, various terms are used which are defined as follows:

$NCP_{1X}$—Position programmed in NC tape (Position 1, in X axis, in this case).

$REC_Z$—Reversal error compensation (component in the Z axis in this case). Added to programmed position when feed is in one direction. Removed when feed is in opposite direction. Constant for each axis at all positions. Used with resolvers only, not with Inductosyns or equivalent types of scales.

$LSC_{1X}$—Lead screw error compensation (component in X axis at $NCP_1$). Magnitude and sign depend on position of the axis. Compensates for lead screw errors when resolvers are used. Compensates for scale errors when scales are used.

$LAG_{1X}$—Lag of the machine axis (component in X axis at $NCP_1$) behind the commanded position due to inertia and friction upon start of motion. Lag magnitude is directly proportional to magnitude of feed rate. Sign is always the same as sign of feed direction.

$CPOS_{1X}$—Commanded position called for by program in control unit, modified by reversal error compensation, lead screw compensation and tool offset. (For $NCP_{1X}$ in this case).

$T0101_X$—Tool offset-first two digits indicate tool number (01 in this case). Second two digits indicate tool offset number, (tool number 01 uses offset number 01 in this case; X indicates offset in X axis). Magnitude and sign are selected for each axis for each tool to locate tool correctly.

$APOS_{1X}$—Actual position. Corresponds to commanded position modified by maching lag. Related to $NCP_{1X}$.

DISPLAY/—Function accomplished by CLM software (display of data in this case).

$AT0101_X$—Adjustment to tool offset. (Tool #1, offset #1, in X axis). Sign may be positive or negative.

$TRIP_{1Z}$—Position at which the sensor trips as the result of touching a surface. (Position in the Z axis, related to $NCP_{1Z}$).

$MTRIP_{2X}$—Trip position, modified by reversal error and lead screw compensation to a calculated position corresponding to programmed position, (related to $NCP_{2X}$).

$DEV_{2X}$—Deviation of modified trip position from programmed position, (deviation of $MTRIP_{2X}$ from $NCP_{2X}$). For axis direction signs used here, the sign tends to be positive when probed surface is further than programmed from position of spindle center line or from work piece reference face.

$DIM_{2X}$—Deviation of part dimension from programmed dimension, (from dimension related to $NCP_{2X}$ in this case). For axis direction signs used herein, the sign is positive when probed diameter is greater than programmed, or probed face is further than programmed from work piece reference face.

$T0630_Z$—Tool offset (in Z axis). Obtained by calibration of turret-mounted probe at work piece surface and used to offset this probe when probing conic and contoured surfaces. Number designation indicates use of tool #6 and offset #30.

$PLO_Z$—Work piece location offset (in Z axis). Used to compensate for deviation of actual location of face which locates work piece axially, and the location of this face used in program. Applied as Z axis offset to all tools, and to turret-mounted probe when probing work piece, but not when probing datum means.

DDIA—Diameter of datum means. Determined by precise measurement in a gauge calibration laboratory.

PDIA—Diameter of work piece.

DDIS—Distance of datum face from face which locates work piece. Used in program.

PLEN—Work piece length, measured parallel to work piece axis between two faces thereof.

It is useful to begin the explanation of a specific method used in the present invention with a discussion of the steps involved in a cutting operation on the lathe. During such an operation, the tool position is controlled by normal computer numerical control functions as already explained and no closed loop machining functions are employed. As employed herein, the terms "tool" and "cutting edge" are occasionally used interchangeably insofar as the discussion of position is concerned. Likewise, the terms "probe" and "probe tip" are sometimes used interchangeably where position is discussed.

The position of the cutting tool is determined by the numerical control program, as modified by reversal error and lead screw compensation, by tool offset and by machine lag. Modification for reversal error is needed when resolvers are used to correct for slack between each lead screw and the nut driven thereby which is attached either to saddle 18 or to cross slide 22. Lead screw compensation is required when resolvers are used to correct for errors in the lead screw itself. When scales are used, lead screw compensation can be used to correct for scale errors. Lead screw errors may be different at different locations on each lead screw.

Modifications of tool offsets is needed to correct for many errors other than reversal and lead screw errors which cause the position of the cutting edge of the tool to deviate from the position which is needed to produce the required dimensions of the work piece. Tool offset can correct for errors on tool and tool holder geometry and some errors in machine geometry; it can also correct for tool, tool holder, machine, work piece and work piece deflection caused by machining forces.

The objective of all these modifications is to position the tool exactly where the numerical control program should put it, so that it will machine the work piece to the programmed dimensions. In actual operation, it takes time to overcome friction and inertia forces and to accelerate a stationary apparatus to a specified feed rate in a given axis. Consequently, the position of the cutting edge is always behind the commanded position, as modified by backlash and lead screw compensation and by tool offset. This is called machine lag and it is always present in an axis which is in motion. It is not present in an axis which is stationary. Lag is proportional to the feed rate along that axis. It should be noted, however, that lag generally does not cause deviations of the final work piece dimensions from the corresponding programmed dimensions because in the process of stopping motion in an axis the machine counts out (removes) the lag as it slows the axis down to a stop.

Figure 6:
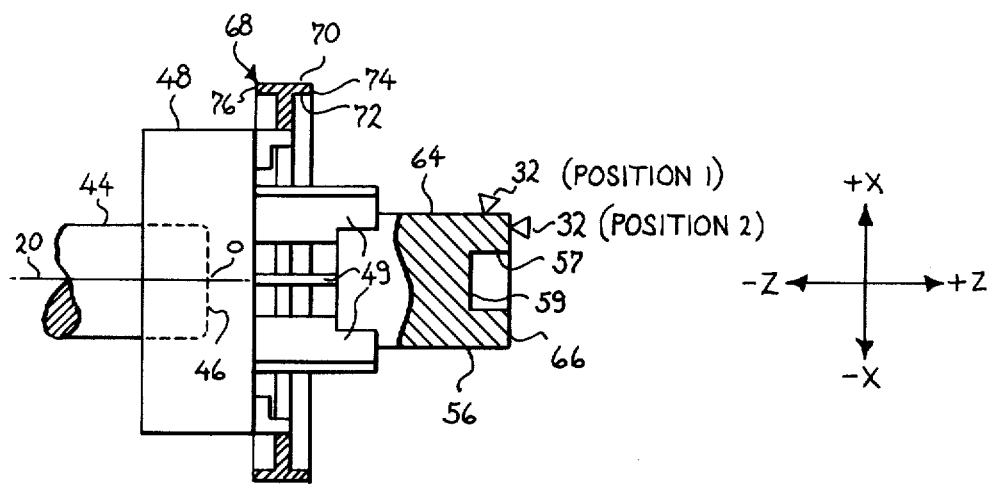
FIG. 6 is a simplified schematic illustration which shows a cutting operation on the work piece.

The cutting operation of a simple work piece 56 is illustrated in schematic form in FIG. 6, applicable reference numerals from FIGS. 1-5 having been brought forward. As shown, work piece 56 is held by chuck 48 and includes peripheral internal and external surfaces 57 and 64, respectively, both cylindrical, and internal and external face surfaces 59 and 66, respectively. Cutting edge 32 of the cutting tool, shown in two separate positions, removes metal (or other material) as it is fed into the work piece while the latter rotates relative to the cutting edge as determined by the rotation of the chuck. In lieu of using the chuck surfaces for datuming, i.e., to calibrate to a position reference, FIG. 6 shows the use of a separate datum ring 68, which is mounted on chuck 48 concentric with center line 20. Datum ring 68 includes outer and inner peripheral surfaces 70 and 72, respectively, as well as outer and inner face surfaces 74 and 76, respectively. The origin 0 of the program stored in the numerical control means is arbitrarily located at the intersection of center line 20 with the nose (face) of spindle 46.

The actual position ($APOS_1$) of cutting edge 32, when cutting peripheral surface 64 of work piece 56, (Position 1), is given for directions parallel to the X and Z axes by the following equations:

$$CPOS_{1X} = NCP_{1X} + T0101_X + (REC_X + LSC_{1X}) + LAG_{1X}$$

$$APOS_{1X} = CPOS_{1X} \text{ (X axis is stationary)}.$$

$$CPOS_{1Z} = NCP_{1Z} + T0101_Z + (REC_Z + LSC_{1Z}) + LAG_{1Z}$$

$$APOS_{1Z} = CPOS_{1Z} - LAG_{1Z} \text{ (Z axis is feeding)}.$$

The actual tool position, (Position 2), for cutting face surface 66 is given by the following equations:

$$CPOS_{2X} = NCP_{2X} + T0101_X + (REC_X + LSC_{2X}) + LAG_{2X}$$

$$APOS_{2X} = CPOS_{2X} - LAG_{2X} \text{ (X axis is feeding)}.$$

$$POS_{2Z} = NCP_{2Z} + T0101_Z + (REC_Z + LSC_{2Z}) + LAG_{2Z}$$

$$APOS_{2Z} = CPOS_{2Z} \text{ (Z axis is stationary)}.$$

The foregoing equations establish the tool positions for rough cutting of surfaces 64 and 66 of the work piece under numerical control.

Figure 7:
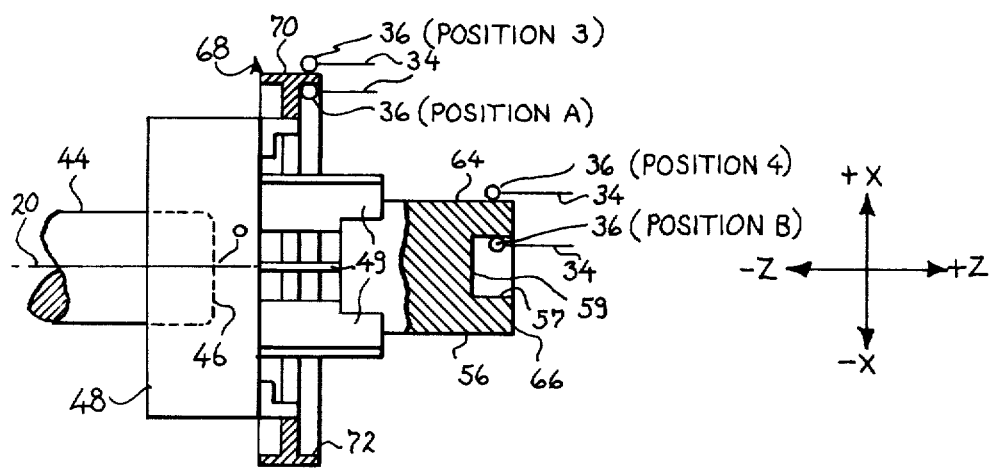
FIG. 7 illustrates the calibration of the probe tip of the turret-mounted probe in the X axis as well as probing in the X axis.

Before the final cut is taken, the work piece must be probed with the position-calibrated probe tip of turret-mounted probe 34 in order to establish the final tool offset. This is shown in FIG. 7. Although probe tip 36 is also calibrated for the purpose of making the initial tool offsets as explained above, re-calibration at this point of the operation serves to eliminate as error sources changes due to heating, strain, etc. of the machine members that may have occurred since that time. The calibration is carried out by energizing motor 40 (FIGS. 1-5) under program control. This action causes probe tip 36 to be positioned under program control in the Z axis direction until it is located opposite datum surface 70. It should be noted that positioning in the Z axis continues until the programmed position of probe tip 36, modified by the backlash and lead screw compensation, is attained. After that position, (Position 3 in FIG. 7), is reached, there is no further motion in the Z axis and hence there is no lag. Accordingly, no modification for lag is required and no tool offset for the turret-mounted probe is provided in this example. The Z axis position or probe tip 36 is determined by ordinary NC operation and is not affected by the CLM functions that ultimately determine positioning in the X axis. Thus, the Z axis position of the probe tip is as follows:

$$CPOS_{3Z} = NCP_{3Z} = REC_Z + LSC_{3Z}$$

$$APOS_{3Z} = CPOS_{3Z} \text{ (Z axis is stationary)}.$$

Positioning of probe tip 36 in the X axis is likewise carried out under program (NC) control, by energization of motor 42. This action places the probe tip where it is about to touch datum surface 70. However, the motion of probe tip 36 in the X axis continues under CLM control, which is called into operation by the aforesaid NC program residing in the numerical control means. When probe tip 36 touches datum 70, the switch in probe 34 is tripped. The tripping action is sensed by NC control which responds by de-energizing motor 42 to stop further motion in the X axis.

The position in the X axis at which the probe switch is tripped may be located before, at, or after the programmed position, as modified by backlash and lead screw compensation and by the lag of the positioning means. It is solely determined by the location of the datum surface 70 and not by the programmed position of probe tip 36. Thus, $$CPOS_{3X} = NCP_{3X} + (REC_{3X} + LSC_X)$$

$$APOS_{3X} = TRIP_{3X}$$

$$TRIP_{3X} <=> CPOS_{3X}$$

where $<=>$ indicates that the trip position may be less than, equal to, or greater than the modified programmed position.

If there is a difference between the programmed position and the actual position in the X axis where tripping occurred, the deviation is determined by comparison and entered as a compensating offset. This is done by calculating a position in the X axis in the numerical control means, using CLM functions. The calculated position is equivalent to the programmed position that would bring the probe tip to exactly the trip position. This equivalent programmed position is calculated from the trip position and is called the modified trip position. It is not necessary to include lag in this calculation, because the trip position is obtained at the moment when tripping occurs.

The CLM functions are put into operation by the NC program stored in the numerical control means. The calculation for the modified trip position is as follows:

$$MTRIP_{3X} = TRIP_{3X} - (REC_X - LSC_{3X})$$

The difference between the modified trip position and the actual programmed position is then calculated by a CLM function. A further CLM function stores this information for future use as an offset adjustment. Where the system is adapted to do so, the information is also displayed or printed out. The calculation of the aforesaid deviation is as follows:

$$DEV_{3X} = MTRIP_{3X} - NCP_{3X}$$

$$DISPLAY, STORE/DEV_{3X}$$

In the terms of actual dimensions, this deviation is the distance in the X axis between the actual (measured) position of datum surface 70, as determined by probe tip 36, and the programmed position of the surface. Thus, the difference is determined along a radius of the datum ring relative to origin 0.

After probe tip 36 has been position-calibrated, the machined surfaces of work piece 56 are probed. This is done at least once before the finishing cut is taken to determine the final tool offset that is to be entered into numerical control means 52. In accordance with the present invention, probe tip 36 is positioned in the Z axis under control of the NC program in the numerical control means, to a location opposite peripheral surface 64. Similarly, probe tip 36 is positioned in the X axis under NC program control until it just touches peripheral surface 64. The probe tip position here is designated as Position 4 in FIG. 7. At this point in the process, surface 64 has been rough-cut to a semi-finished surface which has a programmed diameter 20 mil greater than the programmed diameter of the finished surface in an exemplary embodiment of the invention.

Further positioning of the probe tip in the X axis is carried out under CLM control functions, which are used to perform operations similar to those for calibrating probe tip 36. The probe tip positions in the Z and X axes are given by the following equations:

$$APOS_{4Z} = NCP_{4Z} + (REC_Z + LSC_{4Z})$$

$$APOS_{4X} = TRIP_{4X}$$

$$TRIP_{4X} <=> NCP_{4X} + (REC_X + LSC_{4X})$$

$$MTRIP_{4X} = TRIP_{4X} - (REC_X + LSC_{4X})$$

$$DEV_{4X} = MTRIP_{4X} - NCP_X$$

$$DISPLAY, STORE/DEV_{4X}$$

The deviation defined by the last equation set forth above is the difference along the X axis direction between the actual (measured) position of probe tip 36 on surface 64 and the programmed position of the probe tip. This difference is measured along the radius of work piece surface 64 and tends to be positive when the actual radius is greater than the programmed one and negative when it is smaller than programmed. The difference between the X axis deviation at the datum surface and the X axis deviation at the work piece is equal to the amount by which the actual work piece radius differs from the programmed work piece radius. After this difference is added to any X axis offset which may exist for cutting edge 32, the cutting operation performed by the cutting edge should produce the programmed final diameter for the work piece when the finishing cut is taken. This difference is therefore the adjustment needed for offsetting cutting edge 32.

The adjustment is calculated by CLM functions and is displayed on the NC control display if the system is so equipped. A further CLM function adds this adjustment to the X axis offset for the cutting edge, which is stored in the NC control for the cutting edge.

The pertinent equations are given below:

$$AT0101_X = DEV_{3X} - DEV_{4X}$$

$$DISPLAY/AT0101_X$$

$$ADD\ TO\ EXISTING\ T0101_X/AT0101_X$$

As previously explained, more than one cutting tool may be used to cut external peripheral surface 64. For example, a rough cutting tool may be used at first and the finishing cut may be made with a separate finishing tool. Alternatively, both the semi-finishing cut and the finishing cut may be made with a separate finishing tool. Also, it may be expedient to cut the different surfaces of a work piece, e.g., the peripheral surfaces shown in FIG. 5 which have different diameters, with different cutting tools.

In all such instances, each surface of the work piece which was cut by a different tool may need to be separately probed in the X axis. The purpose of such probing is to determine whatever adjustments are needed in the X axis for the offsets of these additional tools. The calibration of the position of probe tip 36 need not be repeated in most instances for the reason that the deviation obtained at the datum surface is stored by the numerical control means until all peripheral surface probing of the work piece has been completed. After the adjustments of offsets in the X axis have been completed, the deviation stored for this purpose may be discarded. However, adjusted tool offsets continue to be stored for use in further cutting operations.

Offsets in the X axis for tools which machine inside peripheral surfaces, such as surface 57 of the work piece, are made in substantially the same manner. Greater precision is obtainable if the same surface area of probe tip 36 is used for the calibration and for the probing operation. Accordingly, probe tip 36 is calibrated with an inner peripheral surface of the datum ring, i.e., surface 72, as shown in FIG. 7 at Position A. Inner peripheral surface 57 of the work piece is then probed with the same surface area of probe tip 36, as shown at Position B in FIG. 7.

It should be noted that the invention is not limited to the foregoing procedure. Thus, the position of probe tip 36 may be calibrated at outer peripheral datum surface 70 of datum ring 68, before it is used to probe inner peripheral surface 57 of work piece 56. However, errors may be introduced in the offset adjustment if any difference exists between the actual diameter of probe tip 36 and the diameter used in the stored program. Errors may also be introduced by any uncompensated reversal error.

Figure 8:
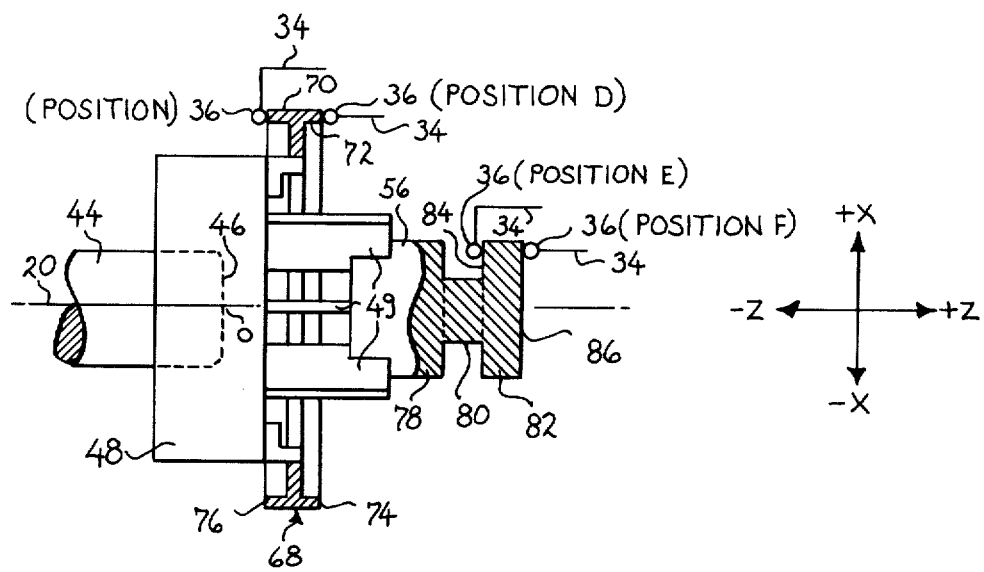
FIG. 8 illustrates Z axis calibration and probing for a work piece of a different configuration.

FIG. 8 shows a work piece 56 of a somewhat different configuration which illustrates the adjustment of offsets in the Z axis of tools used to machine face surfaces of the work piece. The component portions of this work piece are seen to comprise a pair of rings 78 and 82 which have the same diameter, separated by a ring 80 of smaller diameter. The configuration defines a plurality of face surfaces, e.g., surfaces 84 and 86, each of which lies in a plane that is normal to spindle center line 20. Probe tip 36 is calibrated by contact with datum surface 76 (Position C), which constitutes an inside face surface of datum ring 68. Subsequently, the inside face surface 84 of machine work piece 56 is probed, as shown at Position E. Similarly, outside face surface 74 of datum ring 68 is used to calibrate probe tip 36, (Position D), and the calibrated probe tip is then used to measure outside face surface 86 of work piece 56, (Position F). For purposes of determining tool offset adjustments in the Z axis, the probe tip positions in the X axis are determined under program control, i.e., until the probe tip is positioned opposite the desired face surface of the datum ring or of the work piece. The probe tip is likewise positioned under program control in the Z axis. The actual Z axis position is determined by tripping probe 34 when probe tip 36 touches the desired face surface and feeding back a responsive signal to numerical control means 52.

The invention is not limited to the procedure described above. Thus, the position of probe tip 36 may be calibrated against an inside face surface of datum ring 68, such as datum surface 76, and then be used to probe outside face surface 86 of the work piece. However, this practice may result in offset adjustment errors related to the diameter of probe tip 36 and uncompensated reversal errors.

Offsets may also be adjusted to control the length between two face surfaces. In such a case, one face surface is selected as the reference surface and is used in place of the corresponding datum face surface. The other face surface is then cut by the tool whose offset is to be adjusted. If required, offsets may be adjusted after any cut. However, to do so will increase the total time required to machine a work piece, since it does not eliminate the requirement for making the final offset immediately before the finishing cut is made.

In accordance with the present invention, after the finishing cut has been made the actual (final) dimensions of the finished surface are measured to determine their deviation from the selectively determined (programmed) dimensions. To do so, it is first necessary to calibrate the position of probe tip 36. The latter operation is carried out substantially in the way that was used for making the final tool offsets.

Figure 9:
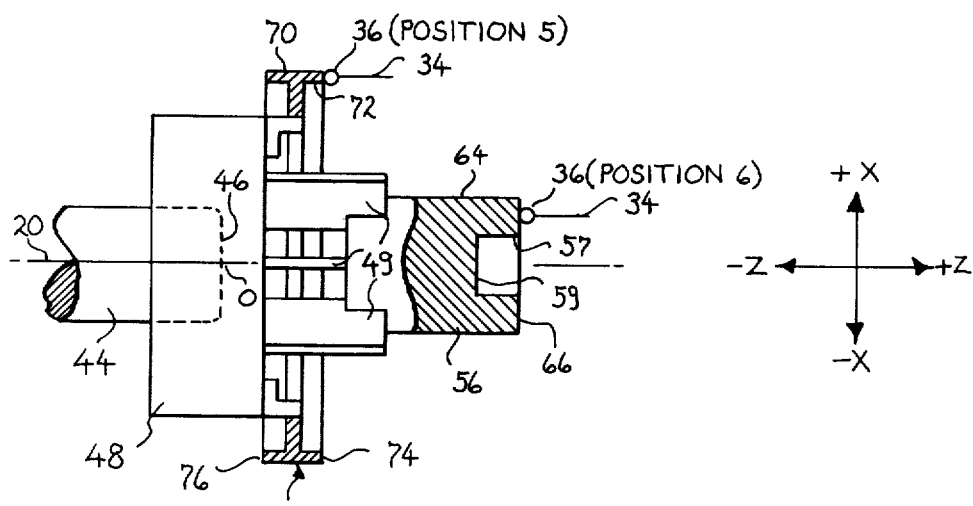
FIG. 9 illustrates the calibration of the probe tip of the turret-mounted probe in the Z axis, as well as probing the Z axis.

The example illustrated in FIG. 9 is limited to the calibration of probe tip 36 in the Z axis prior to measuring the deviation between an actual face surface dimension of the work piece and the corresponding programmed dimension. As shown, in Position 5 probe tip 36 is in contact with datum surface 74, which forms the outer surface of datum ring 68. The pertinent positions for this operation in the X and Z axis and the calculated deviation in the Z axis are defined by the following equations:

$$APOS_{5X} = NCP_{5X} + (REC_X + LSC_{5X})$$

$$APOS_{5Z} + TRIP_{5Z}$$

$$MTRIP_{5Z} = TRIP_{5Z} - (REC_Z + LCS_{5Z})$$

$$DEV_{5Z} + MTRIP_{5Z} - NCP_{5Z}$$

$$\text{DISPLAY, STORE}/DEV_{5Z}$$

The calibration of probe tip 36 is also required in the X axis direction. This calibration likewise follows the operation used for making final tool offsets in the same direction.

Following the calibration of the probe tip, the finished work piece surface is probed. The example below is limited to the probing of work piece face surface 66. Position 6 of probe tip 36, shown in FIG. 9, is defined by the equations set forth below together with the calculated deviation in the Z axis direction:

$$APOS_{6X} = NCP_{6X} + (REC_X + LSC_{6X})$$

$$APOS_{6Z} + TRIP_{6Z}$$

$$MTRIP_{6Z} + TRIP_{6Z} - (REC_Z + LSC_{6Z})$$

$$DEV_{6Z} = MTRIP_{6Z} - NCP_{6Z}$$

$$\text{DISPLAY, STORE}/DEV_{6Z}$$

The determination of the deviation of the measured final dimensions of the finished surface from the desired (programmed) dimensions, is carried out in a manner similar to, although not identical with, the determination of adjustments of tool offsets. Specifically, the deviation determined upon calibration of the position of probe tip 36 is subtracted from the deviation determined by probing the work piece. An example is given below for determining the deviation of a face surface dimension:

$$DIM_{6Z} = DEV_{6Z} = DEV_{5Z}$$

DISPLAY/DIM$_{6Z}$

Deviations in the X axis direction, e.g., of the diameter of a peripheral surface, may be determined in substantially the same way.

Figure 10:
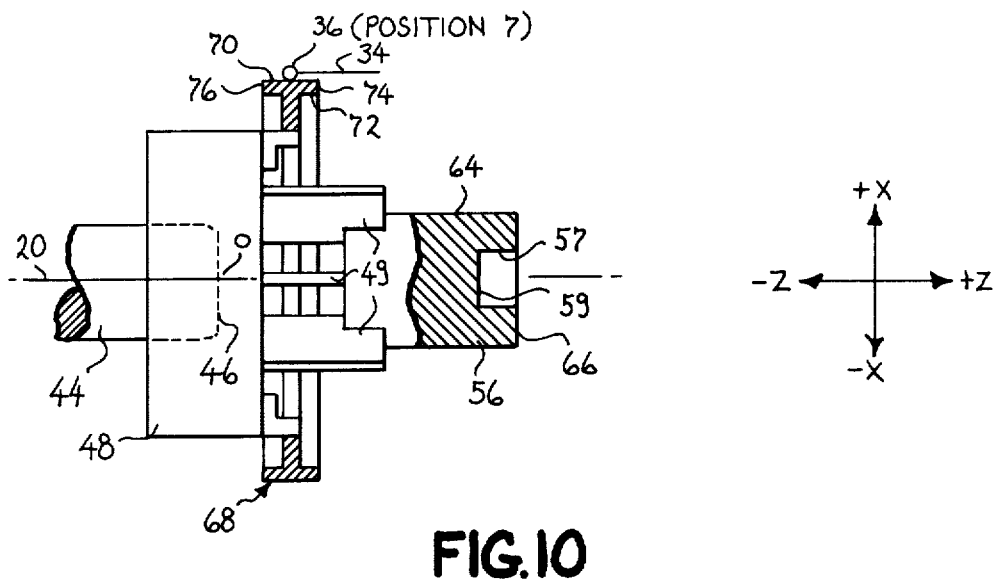
FIG. 10 illustrates the calibration of the turret-mounted probe in the X axis pursuant to making initial tool offsets.

As previously discussed, before any cutting operation can be started, initial tool offset adjustments may need to be made pursuant to the calibration of the tool cutting edge. In general this operation is carried out as previously described. FIG. 10 illustrates an example of a calibration operation, limited to the X axis direction. The calibration of the probe tip 36 is carried out here in preparation for providing tool offsets in the same direction. The position of probe 34, (Position 7 in FIG. 10), places probe tip 36 in contact with peripheral surface 70 of datum ring 68. As was the case for the final tool offset, the actual position of the probe tip—determined upon contact with surface 70, i.e., when turret-mounted probe 34 is tripped and a signal is generated—is compared against the programmed contact position. The calibration of probe tip 36 and the calculated deviation is given by the following equations:

$$APOS_{7Z} = NCP_{7Z} + (REC_Z + LSC_{7Z})$$

$$APOS_{7X} = TRIP_{7X}$$

$$MTRIP_{7X} = TRIP_{7X} - (REC_X - LSC_{7X})$$

$$DEV_{7X} = MTRIP_{7X} - NCP_{7X}$$

DISPLAY, STORE/DEV$_{7X}$

Figure 11:
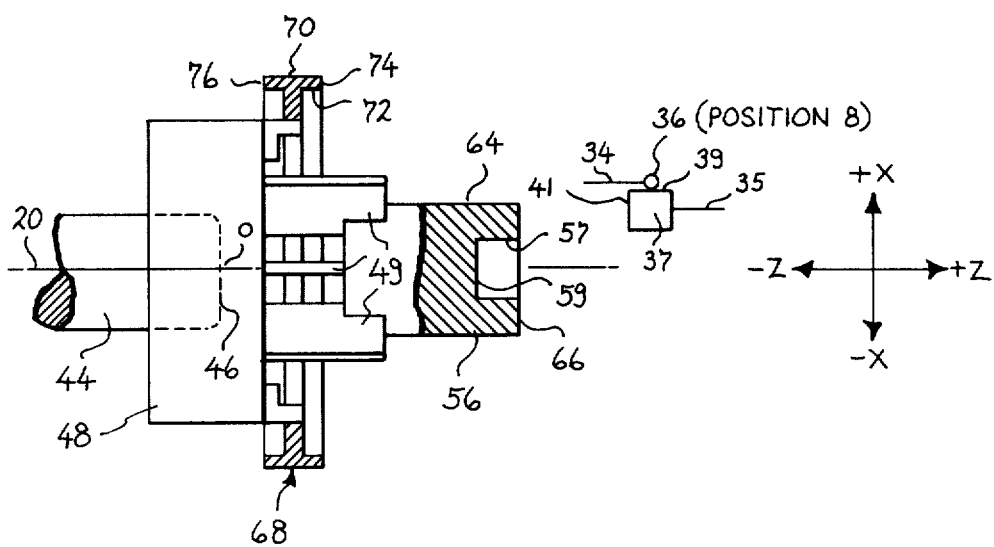
FIG. 11 illustrates the calibration of the bed-mounted probe in the X axis pursuant to making initial tool offsets.

The calibrated probe tip 36 of turret-mounted probe 34 is subsequently used to calibrate the position of tip 37 of bed-mounted probe 35, as illustrated in FIG. 11. In the particular arrangement shown in FIG. 5, probe 35 and work piece 56 are located on opposite sides of turret 28. Accordingly, probe tip 36 is calibrated while being held in the first operating position by turret 28. Following this calibration, turret 28 is indexed (rotated) 180° around the X axis to place probe tip 36 into the second operating position. In the latter operating position, the spherical probe tip 36 can be brought into contact with cube-shaped probe tip 37. Thus, planar probe tip faces 39 and 41, which are parallel to the Z and X axes respectively, can each be contacted at a single defined point by spherical probe tip 36.

Following the aforesaid indexing action, probe tip 36 is positioned along the Z axis under program control to a location opposite face 39. Positioning under program control also occurs in the X axis until probe tip 36 touches surface 39 of probe tip 37 to trip probe 35 and feed back a responsive signal to control unit 52. This is indicated by Position 8 in FIG. 11. As previously explained, probes 34 and 35 are adjusted so that probe 34 does not trip at this time. The foregoing action calibrates the position of surface 39 in the X axis.

Position 8 of probe tip 36 is defined by the following equations for the Z and X axes respectively. Further, the corresponding deviation of this position from the programmed position is given below:

$$APOS_{8Z} = NCP_{8Z} + (REC_Z + LSC_{8Z})$$

$$APOS_{8X} = TRIP_{8X}$$

$$MTRIP_{8X} = TRIP_{8X} - (REC_X - LSC_{8X})$$

$$DEV_{8X} = MTRIP_{8X} - NCP_{8X}$$

DISPLAY, STORE/DEV$_{8X}$

While the foregoing discussion is limited to the calibration of surface 39 of probe tip 37, it will be clear that the position of probe tip surface 41, which is parallel to the X axis, is calibrated in a similar manner. Specifically, probe tip 36 is positioned in the X axis until it is located opposite surface 41. It is also positioned in the Z axis until contact with surface 41 is established and probe 34 is tripped.

After the position of probe tip surfaces 39 and 41 of the bed-mounted probe 35 have been calibrated, cutting edge 32 of tool 30 is calibrated against these surfaces. To do so, turret 28 is again indexed to bring cutting tool 30 into the aforesaid second operating position from which contact between cutting edge 32 and probe tip 37 can be established. If probe 34 and tool 30 are positioned on opposite sides of turret 28, as illustrated in FIGS. 1-5, turret 28 is moved 180° by the last-mentioned indexing operation.

To calibrate the position of cutting edge 32, turret 28 is positioned in the Z axis until it is located opposite probe tip surface 39 of probe tip 37. Positioning of the cutting edge also occurs in the X axis until the cutting edge just makes contact with surface 39. The foregoing positioning in the Z and X axes occurs under NC program control.

Figure 12:
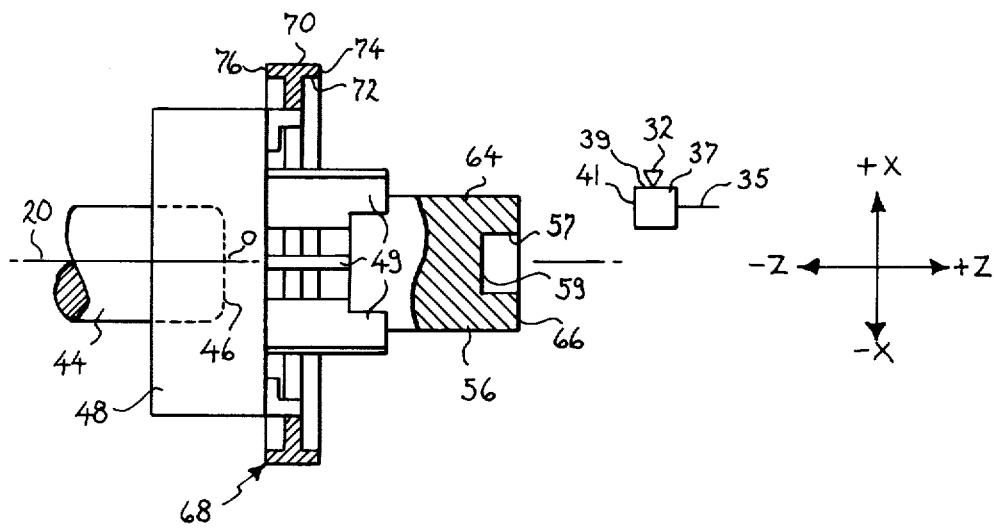
FIG. 12 illustrates the calibration of the tool cutting edge pursuant to making initial tool offsets.

In FIG. 12, which illustrates the calibration of the tool cutting edge pursuant to an initial tool offset, the contact position is designated by Position 9. Subsequent positioning in the X axis direction is carried out under CLM control and continues until probe 35 is tripped. The respective X and Z axis positions and the deviation from the programmed contact position are given by the following equations:

$$APOS_{9Z} = NCP_{9Z} + (REC_Z + LSC_{9Z})$$

$$APOS_{9X} = TRIP_{9X}$$

$$MTRIP_{9X} = TRIP_{9X} - (REC_X + LSC_{9X})$$

$$DEV_{9X} = MTRIP_{9X} - NCP_{9X}$$

DISPLAY, STORE/DEV$_{9X}$

The calibration of cutting edge 32 with respect to probe tip surface 41 is carried out in similar manner to that described for surface 39 and no further explanation is deemed to be necessary.

After all of the foregoing calibration operations have been completed in sequence, i.e., the calibration of probe tip 36, probe tip 37 and cutting edge 32 respectively, the initial tool offset can be determined and entered into the numerical control means. This offset is computed from the deviation obtained when calibrating the position of probe tip 36, the deviation obtained when calibrating probe tip 32, and the deviation obtained when probing probe tip 37 with cutting edge 32. The following equation establishes the initial tool offset:

$$T0101_X = DEV_{7X} - DEV_{8X} + DEV_{9X}$$

DISPLAY, STORE/T0101$_X$

Tool offset in the Z axis may be determined in a way which is similar to that for the X axis.

It will be clear from the foregoing discussion that, whenever an initial offset is determined in either axis for a tool, any previously determined offset which is then stored for that tool in that axis must be discarded in order to prevent erroneous initial offsets. While this operation may be done manually by the machine operator, in the present invention this function is performed automatically by the program which resides in numerical control unit 52.

While the discussion above was confined to surfaces which are parallel to either the X or the Z axis, the invention is not so limited. By suitably controlling the simultaneous energization of motors 40 and 42, the calibration, probing and cutting of conical and other surfaces is readily achievable. For the sake of brevity, the discussion of machining such surfaces has been omitted here.

It will be clear from the foregoing discussion that the invention disclosed herein also lends itself to the measurement of work piece dimensions and that such measurements may be made at any time. In general, the measurement of the dimensions of the work piece on a lathe is made by using the X axis as a scale or micrometer, and using the datum ring as a standard or gauge ring. Axis positions, which are defined as modified trip positions, are used like positions on a scale. Deviations between modified trip positions and programmed positions, which are used when adjusting tool offsets, are not used for the measurement of dimensions.

Figure 13:
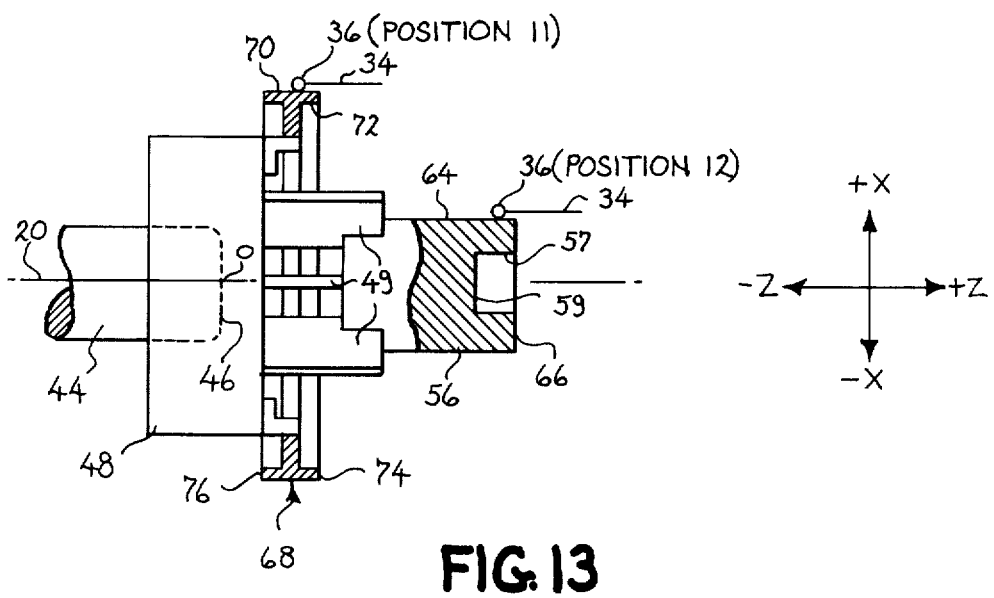
FIG. 13 illustrates a diameter measurement on a machined peripheral work piece.

FIG. 13 illustrates a diameter measurement of a machined peripheral surface. The pertinent equations for the measure are given by the following set of equations, reference being had to Positions 11 and 12 in FIG. 13:

$$MTRIP_{11X} = TRIP_{11X} - SRAD - (REC_X - LSC_{11X})$$

$$MTRIP_{12X} = TRIP_{12X} - SRAD - (REC_X - LSC_{12X})$$

$$PDIA_{12} = DDIA - 2(MTRIP_{11X} - MTRIP_{12X})$$

DISPLAY, PRINT/$PDIA_{12}$

The difference between the radius of datum ring 68, (the datum ring diameter being included in the stored NC program), and the radius of work piece 56 is obtained by probing external peripheral datum surface 70 (Position 11) and external peripheral work piece surface 64 (Position 12). An X axis position is determined for each radius and the distance along the X axis between the two positions is obtained by subtracting the position for the radius of the work piece from the position for the radius of the datum ring. This radius difference is doubled to obtain the diametral difference whose sign, negative or positive, indicates whether the work piece has a smaller or larger diameter respectively, than the datum ring. The substraction of the diameter differences from the diameter of the datum ring then yields the diameter of the work piece.

The radius SRAD of probe tip 36 is used in the calculation of the modified trip position MTRIP, so that the MTRIP positions represent the X axis positions for the datum ring and work piece radii. If SRAD were not used, the X axis positions would represent datum ring and work piece radii plus the probe tip radius, in other words the position of the center of probe tip 36.

Axial locations on the work piece, i.e., locations along the Z axis or parallel thereto, are frequently determined by the position of the faces of chuck jaws 49. These faces are designated by the reference numerals 73 and 75 in FIG. 14 which illustrates the measurement of a location offset pursuant to the determination of an axial location (along the Z axis) on the work piece. Since the jaw faces are machined periodically, a work piece axial location will generally differ from the corresponding location used in the program. Consequently, it is necessary to compare the actual chuck face location with the programmed face location and to compensate for any deviation by offsetting all tools in the Z axis. This is done before the work piece is placed into the chuck.

Figure 14:
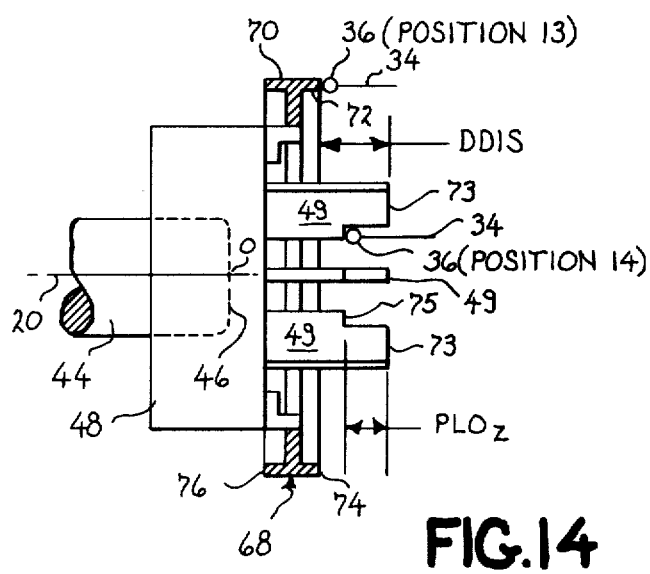
FIG. 14 illustrates the measurement of a location offset pursuant to the determination of an axial location on a work piece.

As will be clear from a consideration of FIG. 14, the axial offset $PLO_Z$ is the distance in a direction parallel to the Z axis of the chuck face 75, which locates the part in the Z axis direction, from the programmed position of that face which is represented by the reference numeral 73. The latter is shown to be located a distance DDIS from the programmed position of datum face 74, again measured in a direction parallel to the Z axis. The position of probe tip 36 of probe 34 upon contact with face 74 of datum ring 68 is designated as position 13 in the drawing. The position of probe tip 36 upon contact with chuck face 75 is designated as position 14. The location offset on the work piece can then be determined as follows:

$$DEV_{13Z} = MTRIP_{13Z} - NCP_{13Z}$$

$$DEV_{14Z} = MTRIP_{14Z} - NCP_{14Z}$$

$$PLO_Z = DEV_{14Z} - DEV_{13Z}$$

DISPLAY, STORE/$PLO_Z$

Location offset $PLO_Z$ is applied as a Z axis offset to all tools to enable them to produce programmed work piece dimensions. To accomplish this, the location offset of the work piece is stored in numerical control unit 52 and the program provides instructions for automatically adding this offset to whatever other offset in the Z axis direction is stored for that tool.

Whenever a location offset for a particular work piece is determined, any previously obtained offset must be discarded and replaced by the new offset so that the stored location offset for that work piece will be correct and provide the appropriate offset for addition to future initial tool offsets.

The location offset for the work pieces also applies as an offset to the turret-mounted probe 34 when that probe is used to probe a face of the work piece, but not when it is used to probe a datum face. This is done when adjusting tool offsets and while determining work piece dimensions and dimensional deviations. The offset for the turret-mounted probe 34 is discarded immediately after each use to prevent erroneous offsets. Instructions in the stored program are used for automatically applying and discarding the location offset for probe 34. It should be noted that location offset for the work piece may not be used to correct for a deviation of the datum face location from the face location used in the program since that could easily result in errors.

Figure 15:
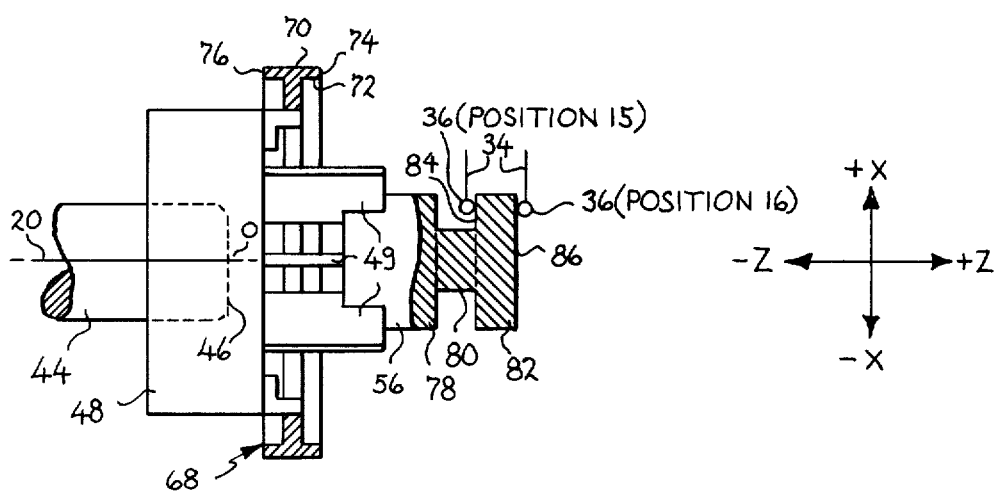
FIG. 15 illustrates a length measurement on a machined work piece using a work piece configuration similar to that shown in FIG. 8.

The measurement of length dimensions along the Z axis from one face surface of the work piece to another face surface occurs as illustrated in FIG. 15 wherein work piece 56 has a configuration identical to that shown in FIG. 8, i.e., consisting of three separate rings 78, 80 and 82. Here, the location offset of the work piece is used as an offset for probe tip 36 each time the work piece is probed. The use of this offset assures that turret-mounted probe 34 will trip in situations where the work piece locating face surface, e.g., surface 84, is located at a relatively great distance from the programmed location of such face surface. The drop measurement operation is defined by the equations below:

$$MTRIP_{15Z} = TRIP_{15Z} - (REC_Z + LSC_{15Z}) + SRAD + PLO_Z$$

$$MTRIP_{16Z} = TRIP_{16Z} - (REC_Z + LSC_{16Z}) - SRAD + PLO_Z$$

$$PLEN_{16} = MTRIP_{16Z} - MTRIP_{15Z}$$

DISPLAY, PRINT/$PLEN_{16}$

It will be noted that the radius SRAD of probe tip 36 is included in the calculation of the modified trip positions, such that $MTRIP_{15Z}$ and $MTRIP_{16Z}$ positions represent the positions of work piece faces 84 and 86 respectively, in the Z axis direction, rather than the positions of the center of probe tip 36.

The foregoing description, when considered in conjunction with the accompanying drawings, is deemed to be sufficient to convey a full understanding to those skilled in the art of the system and method which constitute the subject matter of the present invention. In addition, an exemplary computer program is submitted herewith as Appendix A of this specification, which sets forth in detail the steps for carrying out the method disclosed herein.

It will be clear from the foregoing discussion that the system and method of precision machining disclosed herein, wherein tool offset adjustments are made automatically, is superior to conventional numerically controlled machining systems wherein an operator controls the dimensions of the work piece by manually making tool offsets to compensate for errors of all kinds. Among other advantages, the invention makes possible significantly higher production rates by increasing the capacity of each machine tool. The foregoing advantage also applies with respect to closed loop machining systems which are automated under computer numerical control. The manner in which the present invention automatically determines and implements tool offsets not only provides a machine tool of higher manufacturing capacity, but also one which is capable of machining a work piece with greater precision.

Nevertheless, the present system is subject to errors from a number of sources which must be recognized and dealt with. Dimensional deviations may arise from program errors, machine errors, tool wear, strain of the work piece, datum errors and from errors due to the turret-mounted probe. However, by properly identifying the error source in each instance, preventive or remedial measures can be taken to prevent such errors from showing up in the final dimensions of the finished surface. For example, it has already been shown how errors due to variations of the probe tip surface can be avoided by using the same area of the probe tip surface for datuming and for measuring. Similarly, allowance must be made for the fact that commercially available probes do not trip upon contact, but within approximately 0.2 mils of the contact position. If the precise trip point is determined beforehand, allowance can be made for the difference between it and the point of contact.

Generally speaking, differences in the actual location of a particular datum surface and its location in the stored program will not produce dimensional deviations of the work piece if the same differences apply to work piece locations. Consequently, in the case of a lathe for example, temperature changes to which the lathe head stock and the lathe spindle are subjected and which produce equal positional changes of the datum surfaces and of the work piece locations, will not cause dimensional deviations when the work piece is machined. This is important to recognize because the datum surfaces and the work piece may suffer a change of location by as much as 1 mil or more in the X or Z axis direction, as the head stock and the spindle heat up during operation of the machine.

However, any differences between an actual location of a datum surface and the corresponding position stored in the NC control unit must be duplicated by work piece location differences. If not, they are capable of causing equivalent deviations of the dimensions of the work piece. For example, if face surface 74 of datum ring 68 in FIG. 9 is actually located 10 mils further from the origin than its programmed position indicates, face surface 66 of work piece 56 will likewise be 10 mils further to the right. Any differences between the actual dimensions of the datum ring and the dimensions stored in the NC control unit, unless compensated for, will cause deviations in the dimensions of the work piece of the same magnitude. Thus, if the diameter of datum ring 68 is 10 mils greater than its programmed diameter, the diameter of work piece 56 will also be 10 mils greater. In general, any machine errors that are not compensated with NC compensation functions, or with adjustments to the machining program, or with tool offsets, can cause equivalent deviations of the dimensions of the work piece.

When resolvers are used to obtain position feedback information, the reversal error may be on the order of 1 mil or more. Unless a reversal of direction can be avoided, this error must be compensated. Another potential dimensional variation arises from probing the datum ring in a direction different from that used for probing the work piece with the same probe tip. As already mentioned, the change of direction exposes different areas of the spherical probe tip to contact. Dimensional deviations will arise if probe tip 36 is not a uniform sphere. Thus, as a general rule, the probing directions should be the same wherever possible and compensation may have to be provided when they are not.

Insofar as tool errors are concerned, any difference between the actual location of the cutting edge of the tool and its programmed location is automatically corrected each time a tool offset is determined with CLM functions. To assure that the offsets which have been made do in fact correct for tool wear, all surfaces of the work piece must be probed near the end of the cut where the work piece dimension will reflect the wear condition just prior to making the offset adjustment. If this is not done, any tool wear which occurs after the offsets are made will generally produce equivalent deviations of the work piece dimensions.

Dimensional deviations may also occur as a result of strain during a cutting operation, which may be expressed in the form of a deflection of the tool, the tool holder, certain components of the lathe and deflection of the work piece itself. Since strain is caused by cutting forces, it does not occur during probing. Therefore, the effects of strain on work piece dimensions must be recognized when the work piece is probed, so that the tool offset adjustments that are made will also compensate for this source of error. In general, since the final tool offset is determined from the semi-finished surface, strain errors will be avoided if the strain can be equalized during the last two cuts, i.e., the semi-finishing cut and the finishing cut. Accordingly, these cuts are preferably made at substantially the same depth, at the same speed of rotation of the work piece and at the same feed rate.

It will be apparent from the preceding discussion, that the various error sources to which the system and method disclosed herein are subject, can be compensated for more readily with the present invention than is the case in prior art CNC or DNC closed loop-machining systems and that such compensation is implemented in a manner which makes intervention by the operator unnecessary. Accordingly, the manufacturing capacity of the machine is not diminished and the precision with which work pieces may be machined to desired dimensions remains high.

The system and method which constitute the subject matter of the present invention are not limited to the specific embodiments disclosed herein. The principles of the invention are equally applicable to variations of the machine tools disclosed, e.g., to a lathe with a vertically positioned spindle, or a lathe whose axes of motion are not mutually perpendicular. Similarly, the invention disclosed and claimed is applicable to other types of machine tools such as, for example, a milling machine or machining center. In contrast to a lathe, there may be three or more axes of machine motion in a milling machine. Further, relative motion between the cutting tool and the work piece is carried out by rotation of the cutting tool rather than by rotation of the work piece. The cutting tool normally remains in place in a milling machine, while the work piece holding means may be movable in two or more axes and is so positioned for cutting. Further, the bed-mounted probe is mounted to the work piece holding means which rides on, and with respect to, the bed of the machine. It will be clear that in such an arrangement, e.g., in a three-axis machining set-up, probing as well as position feedback must occur in all three axes of machine motion.

From the foregoing description, it will be clear that the invention leads itself to numerous variations, modifications, substitutions and equivalents, all of which will now be apparent to those skilled in the art. Accordingly, it is intended that the invention be limited only by the scope of the appended claims.

We claim:

1. A method for automatically machining at least one surface of a work piece to precise, selectively determined dimensions by the use of a closed loop numerically controlled machining system;

said system comprising programmable computer numerical control means adapted to operate under the direction of a machining program which includes said selectively determined dimensions, machining apparatus including a stationary bed, work piece holding means, and tool holding means adapted to carry one or more tools and to place selected ones of said tools into operating position, means for providing relative motion between the selected tool and said work piece when each is mounted in its respective holding means, said tool being adapted to effect the removal of material from said work piece during said relative motion when a cutting edge of said tool bears against said work piece, means controlled by said numerical control means for positioning said holding means relative to each other at least in first and second axes of motion of said machining apparatus, position feedback means adapted to indicate to said numerical control means the relative position of said respective holding means at least in said first and second axis respectively, position reference means associated with said machining apparatus and including at least a pair of reference surfaces each corresponding to a separate one of said axes, each of said reference surfaces providing a calibrated position reference with respect to the origin position of said program, a first contact probe adapted to be mounted in a tool holding location of said tool holding means, and a second contact probe mounted with its probe tip accessible for contact by the tip of said first probe and by said cutting edge respectively, each of said contact probes being adapted to provide an indication to said numerical control means when the tip of said probe makes contact with a surface;

said method comprising the steps of:

(1) placing said first probe into operating position in said tool holding means;

(2) probing said at least first and second reference surfaces with said first probe to calibrate the position of its probe tip at least in said first and second axes, said reference surface probing operation including the steps of positioning said respective holding means relative to each other in each of said axes until said first probe tip individually establishes contact with the reference surface corresponding to each axis;

(3) storing a first set of deviations in said numerical control means each determined by the difference along one of said axes between the programmed position of said first probe tip for contact with a reference surface in said axis and its actual contact position derived from the concurrently indicated position feedback;

(4) probing the tip of said second contact probe with said first probe to calibrate the position of said second probe tip at least in said first and second axes, the last-recited probing operation including the steps of positioning said respective holding means relative to each other in each of said axes until said first probe tip establishes contact with said second probe tip individually along each axis;

(5) storing a second set of deviations in said numerical control means each determined by the difference along one of said axes between the programmed position of said first probe tip for contact with said second probe tip in said axis and the corresponding actual contact position of said first probe tip derived from the concurrently indicated position feedback;

(6) placing a selected tool into operating position in said tool holding means;

(7) probing said second probe tip with said cutting edge of said selected tool to calibrate the position of said cutting edge at least in said first and second axes, said edge probing operation including the steps of positioning said respective holding means relative to each other in each of said axes until said cutting edge establishes contact with said second probe tip individually along each axis;

(8) storing a third set of deviations in said numerical control means each determined by the difference along one of said axes between the programmed position of said cutting edge for contact with said second probe tip in said axis and its actual contact position derived from the concurrently indicated position feedback;

(9) storing a first set of compensating offsets for said selected tool in said numerical control means determined by one of each said first, second and third sets of deviations for each axis;

(10) machining said work piece in accordance with said program modified by said first set of offsets to provide a semi-finished surface on said work piece;

(11) placing said first probe into operating position in said tool holding means;

(12) probing said semi-finished surface with said first probe at least in one of said axes, said last-recited probing operation including at least the step of positioning said respective holding means relative to each other in said axis until said first probe tip establishes contact with said semi-finished surface;

(13) storing a fourth set of deviations in said numerical control means each determined by the difference along one of said axes between the originally programmed position of said first probe tip for contact with said semi-finished surface in said axis and its actual contact position derived from the concurrently indicated position feedback;

(14) storing a set of offset ocrrections for said selected tool in said numerical control means determined at least in part by one of said fourth set of deviations for each axis;

(15) storing a final set of compensating offsets for said selected tool in said numerical control means determined by one of each of said first set of offsets and said set of offset corrections for each axis;

(16) placing a selected tool into operating position in said tool holding means; and

(17) machining said work piece in accordance with said program modified by said final set of offsets to provide said finished surface.

2. A method in accordance with claim 1 wherein said machining program further includes the allowable machining tolerance for each of said selectively determined dimensions and wherein the machining operation to provide said finished surface is followed by the steps of:

(18) placing said first probe into operating position in said tool holding means;

(19) probing said finished surface with said first probe at least in one of said axes, said probing operation of said finished surface including at least the step of positioning said respective holding means relative to each other in said axis until said first probe tip establishes contact with said finished surface;

(20) storing a fifth set of deviations in said numerical control means each determined by the difference along one of said axes between the originally programmed position of said first probe tip for contact with said finished surface in said axis and its actual contact position derived from the concurrently indicated position feedback;

(21) providing an indication of the actual final dimensions of said finished work piece surface determined at least in part by one of said fifth set of deviations and by one of said selectively determined dimensions for each axis; and

(22) providing an indication of the deviation of each of said actual final dimensions from the corresponding selectively determined dimension stored in said numerical control means together with an indication of said allowable machining tolerance for each of said selectively determined dimensions.

3. A method in accordance with claim 2 wherein steps (2) and (3) are further performed in succession immediately preceding step (12) to store a sixth set of deviations and immediately preceding step (19) to store a seventh set of deviations respectively in said numerical control means;

wherein the magnitude of said offset corrections is further determined for each axis by one of said sixth set of stored deviations; and wherein the magnitude of said actual final dimensions is further determined for each axis by one of said seventh set of stored deviations.

4. A method in accordance with claim 3 wherein:

said first offsets stored in step (9) are computed from said first, second and third sets of stored deviations;

said offset corrections stored in step (14) are computed from said fourth and sixth sets of stored deviations;

said final offsets stored in step (15) are computed from said stored first offsets and said stored offset corrections;

said actual final dimensions indicated in step (21) are computed from said fifth and seventh sets of stored deviations and said selectively determined dimensions; and said deviations from said selectively determined dimensions indicated in step (22) are computed from the latter dimensions and said actual final dimensions.

5. A method in accordance with claim 4 wherein said position reference means and said work piece respectively are accessible for contact only from a first operating position of said first probe established by said tool holding means, and wherein said second probe is accessible for contact by said first probe and by said tool respectively only from a second operating position established by said tool holding means remote from said first operating position;

wherein said tool holding means is moved to place said first probe into said first operating position for carrying out steps (2), (12) and (19) respectively, and into said second operating position for carrying out step (4); and wherein said tool holding means is moved to place said tool into said first operating position for carrying out steps (10) and (17) respectively, and into said second operating position for carrying out step (7).

6. A method in accordance with claim 5 wherein the operation recited by step 10 further comprises the steps of:

machining said work piece by rough-cutting with said selected tool until a predetermined amount of material remains to be removed, said predetermined amount of material being chosen to permit said finished surface to be obtained with a programmed semi-finishing cut and a programmed finishing cut of substantially identical predetermined depth;

moving said tool holding means to place a selected finishing tool into said second operating position adapted to provide said semi-finished and said finished surfaces;

probing said second probe tip with a cutting edge of said selected finishing tool to calibrate the position of said last-recited edge at least in said first and second axes, said last-recited edge probing operation including the steps of positioning said respective holding means relative to each other in each of said axes until said last-recited cutting edge establishes contact with said second probe tip individually along each axis;

storing an eighth set of deviations in said numerical control means each computed from the difference along one of said axes between the programmed position of the cutting edge of said selected finishing tool for contact with said second probe tip in said axis and its actual contact position derived from the concurrently indicated position feedback;

computing a second set of compensating offsets for said finishing tool, said second compensating offsets being determined for each axis from one of each of said first, second and eighth sets of deviations;

storing said second set of compensating offsets in said numerical control means in substitution for said first set of compensating offsets;

moving said tool holding means to place said selected finishing tool into said first operating position; and machining said work piece in accordance with said program modified by said second set of offsets to provide said semi-finished surface on said work piece;

whereby the depth of the finishing cut taken in step (17) differs from that of said semi-finishing cut substantially only by the difference between said programmed finishing cut and said final compensating offsets.

7. A method in accordance with claim 5 wherein said machining apparatus is a lathe and said first and second axes are mutually perpendicular, said second probe being mounted in fixed relationship to said stationary bed, said lathe including a rotatable spindle, a saddle, a cross slide disposed on said saddle, said tool holding means being carried by said cross slide, and said means for providing relative motion between the selected tool and said work piece including means for rotating said work piece holding means jointly with said spindle;

wherein the positioning of said respective holding means relative to each other is provided by moving said saddle and said cross slide in said first and second axes respectively relative to said work piece holding means.

8. A method in accordance with claim 4 wherein said first and second axes are mutually perpendicular, said second probe being mounted to said work piece holding means, said work piece holding means being capable of moving at least in one of said first and second axes with respect to said stationary bed, said tool holding means being capable of moving at least in a third axis normal to the plane defined by said first and second axes, said position feedback means being further adapted to indicate to said numerical control means the relative position of said respective holding means in said third axis, and said means for providing relative motion between the selected tool and said work piece including means for rotating said tool around its own axis;

wherein said probing steps are further carried out in said third axis and said respective holding means are positioned relative to each other by moving said work piece holding means at least in one of said first and second axes respectively and by moving said tool holding means at least in said third axis; and wherein further compensating offsets may be computed and stored in said numerical control means representative of the difference along said third axis between the programmed position of said probe or of said cutting edge respectively for contact with a surface and the corresponding actual contact position derived from said position feedback.

9. A system for automatically machining at least one surface of a work piece to precise, selectively determined dimensions by the use of a numerically controlled, closed loop machining system;

said system comprising:

programmable computer numerical control means;

machining apparatus including a stationary bed, work piece holding means, and tool holding means adapted to mount one or more tools and to place a selected one of said tools into operating position;

a first contact probe adapted to be mounted in a tool holding location of said tool holding means;

a second contact probe mounted with its probe tip accessible by the tip of said first probe and by said cutting edge respectively;

means for providing relative motion between a selected tool and said work piece when each is mounted in its respective holding means, said tool being adapted to effect the removal of material from said work piece during said relative motion when a cutting edge of said tool bears against said work piece;

means controlled by said numerical control means for positioning said respective holding means relative to each other at least in first and second axes of motion of said machining apparatus;

position feedback means adapted to signal to said numerical control means information representative of the actual positions of said respective holding means at least in said first and second axes respectively to enable said numerical control means to position said holding means under closed loop control;

position reference means associated with said machining apparatus and including at least one position reference surface corresponding to one of said axes, said position reference surface providing a calibrated position reference with respect to the origin position of a machining program adapted to direct the operation of said numerical control means;

said programmably directed numerical control means being adapted to operate said positioning means such that the contact tip of said first probe, the contact tip of said second probe and said tool cutting edge are sequentially calibrated at least in said one axis upon contact with said corresponding position reference surface, said first probe and said second probe respectively; and said numerical control means further including means for storing compensating offsets for each of said axes computed from the deviations determined in each axis between the programmed and actual contact positions for said first probe and said tool cutting edge respectively;

wherein said stored compensating offsets are adapted to modify the programmed machining operation on said work piece.

10. A system in accordance with claim 9 wherein said machining apparatus is a lathe, said first and second axes being mutually perpendicular and said second probe being mounted in fixed relationship to said stationary bed, a rotable spindle positioned substantially parallel to said first axis;

means for rotating said spindle;

a saddle adapted to move relative to said stationary bed;

a cross slide mounted on said saddle and adapted to move relative to the latter;

said tool holding means being carried by said cross slide;

said position reference means being mounted on said work piece holding means, at least one of said position reference surfaces comprising a cylindrical surface coaxial with said first axis at a calibrated radial distance from said position origin, at least one other position reference surface comprising a planar face surface normal to said first axis and at a calibrated axial distance from said position origin;

said tool holding means being adapted to move each tool or probe mounted thereon selectively to an operating position for providing access to said position reference means and to said work piece, and to an operating position for providing access to said second probe;

said means for providing relative motion between the selected tool and said work piece comprising means for rotating said work piece holding means jointly with said spindle;

said positioning means comprising means for moving said saddle and said cross slide in said first and second axes respectively; and said position feedback means including means for signaling information to said numerical control means representative of the position of said saddle and of said cross slide respectively along respective ones of said axes.

11. A system in accordance with claim 9 wherein said first and second axes are mutually perpendicular and said second probe is mounted to said work piece holding means;

said positioning means comprising means for moving said work piece holding means at least in said first axis and means for moving said tool holding means at least in a third axis normal to the plane defined by said first and second axes;

said means for providing relative motion between the selected tool and said work piece including means for rotating said tool around its own axis;

said position reference means being mounted on said work piece holding means and including said at least one position reference surface normal to its corresponding axis;

said position feedback means including means for signaling to said numerical control means the actual position of said work piece holding means at least in one of said first and second axes respectively, and means for signaling the actual position of said tool holding means at least in said third axis;

said numerical control means being further adapted to operate said positioning means to carry out probing and position calibration in said third axis and to store a copensating offset computed from the deviations determined in said third axis between said programmed and actual contact positions.

12. A system in accordance with claim 9 wherein said cutting edge has a curved configuration; and wherein the contact tips of said first and second probes have substantially spherical and cubical configurations respectively;

wherein all probing contacts occur substantially at a point.

* * * * *